United States Patent [19]

Hsiue et al.

[11] Patent Number: 5,091,274
[45] Date of Patent: Feb. 25, 1992

[54] IONIC CONDUCTING POLYMER ELECTROLYTES BASED ON A SIDE-CHAIN CRYSTALLINE POLYMER

[75] Inventors: Ging-Ho Hsiue; Chain-Shu Hsu, both of Hsinchu; Chang-Jyh Hsieh, Taipei; Deng-Shan Chen, Tungshan Hsiang, all of Taiwan

[73] Assignee: National Science Council, Taipei, Taiwan

[21] Appl. No.: 540,570

[22] Filed: Jun. 19, 1990

[51] Int. Cl.[5] .................................. H01M 10/40
[52] U.S. Cl. ............................... 429/192; 252/62.2; 252/299.2
[58] Field of Search ............ 429/192; 252/62.2, 299.2

[56] References Cited

U.S. PATENT DOCUMENTS

| | | | |
|---|---|---|---|
| 4,657,694 | 4/1987 | Heeger et al. | 252/299.2 X |
| 4,737,422 | 4/1988 | Knight et al. | 429/192 |
| 4,798,773 | 1/1989 | Yasukawa et al. | 252/62.2 |

FOREIGN PATENT DOCUMENTS 63-170857 7/1988 Japan ..................... 429/192

OTHER PUBLICATIONS

Hsu et al., *J. Polymer Science*, 25, 2909-2923 (1987).
Hsu et al., *J. Polymer Science*, 27, 453-466 (1989).

Primary Examiner—Stephen J. Kalafut
Attorney, Agent, or Firm—Bacon & Thomas

[57] ABSTRACT

The present invention provides an ionic conducting polymer electrolyte which is a complex compound prepared from an alkali metal salt and a side-chain liquid crystalline polysiloxane of the formula

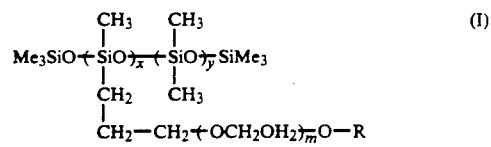

wherein R =

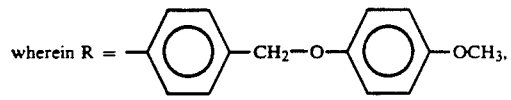

or 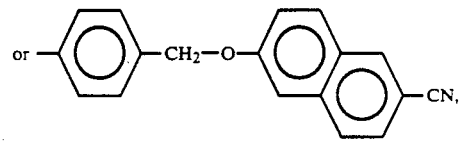

or 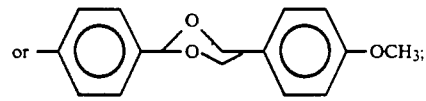

wherein Me=—$CH_3$; m is an integer of 1-5; x=10-100%, y=0-90%; and $\overline{Mw}$(polysiloxane backbone)=1,000-15,000.

1 Claim, 16 Drawing Sheets

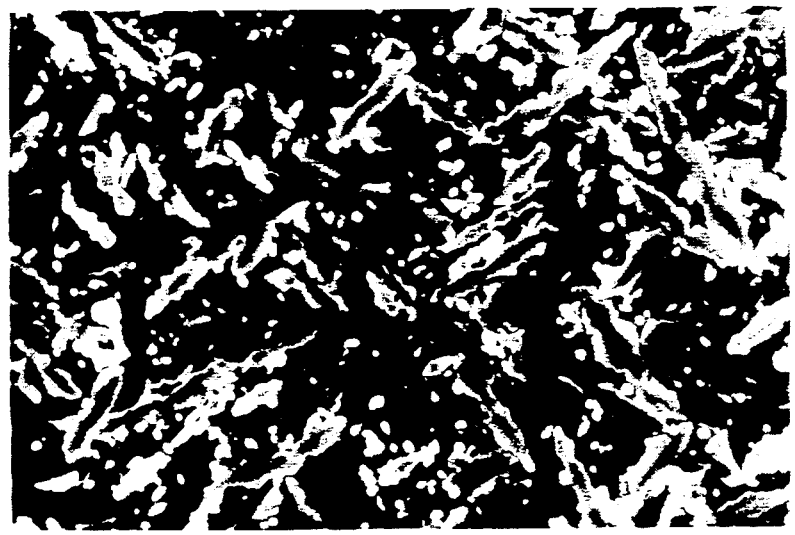
F I G. 9A
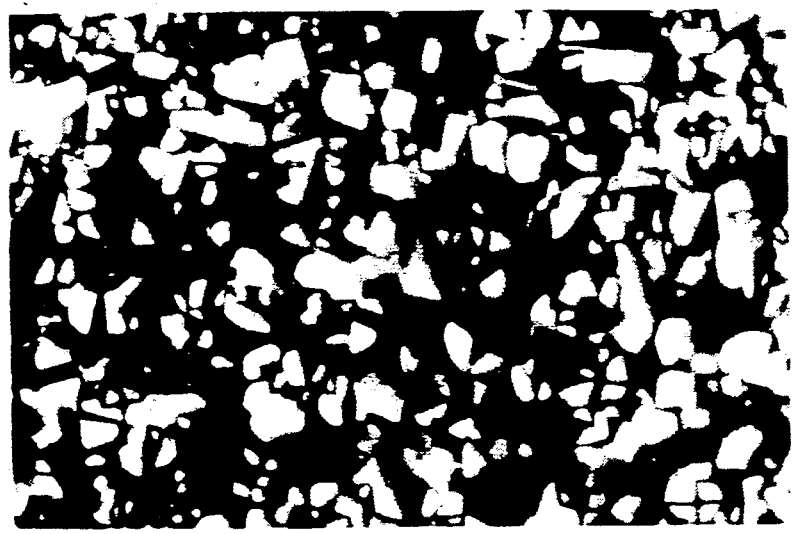
F I G. 9B

IONIC CONDUCTING POLYMER ELECTROLYTES BASED ON A SIDE-CHAIN CRYSTALLINE POLYMER

TECHNICAL FIELD OF THE INVENTION

The present invention is related to a solvent free ionic conducting polymer electrolytes.

BACKGROUND OF THE INVENTION

It is known in the art that there are two types of solid electrolytes are used in a high energy density battery, one is made from inorganic acid salts and the other one is made from organic polymers. The inorganic acid salt eletrolytes have a superior conductivity, but also suffer a lower decomposition electrical potential and a higher interface resistance between the electrode and the electrolyte in comparision with the organic polymer electrolytes.

The majority of polymer electrolyte systems reported in the literature to date have largely based on poly(ethylene oxide), PEO, incorporating an alkali metal salt. Recently, some studies were focused on the complexes formed by alkali metal salts and comb-like polymers containing oligo(oxyethylene) side chains. Interest in these comb-like polymers for the preparation of polymer electrolytes, comes from the high segmental mobility of side chains and the low glass transition temperature exhibited by these polymers. Several articles have reported on the conductivity of solid complexes of Li-salts and comb-like polysiloxanes with oligo(oxythylene) side groups, such as an article by Hall, et al. entitled "Ion conductivity in polysiloxane comb polymers with ethylene glycol teeth" *Polym. Commun.*, 27, 98 (1986); another article by Cowie, et al. entitled "Ionic conductivity in poly(di-poly(propylene glycol)itaconate)-salt mixtures" *Polymer*, 28, 627 (1987), and another article by Fish, et al. entitled "Conductivity of solid complexes of lithium perchlorate with poly{[w-methoxyhexa(oxyethylene)ethoxy]methylsiloxane} *Makromol. Chem., Rapid Commun.*, 7, 115 (1986).

Since Ringsdorf, Finkelmann and Wendorff introduced the spacer concept in their articles entitled "Polyreactions in ordered system, 14. Model considerations and examples of enantiotropic liquid crystalline polymers" *Makromol. Chem.*, 179, 273 (1978), and "Liquid crystalline polymers with biphenyl-moities as mesogenic group" *Makromol. Chem.*, 179, 2541 (1978), a large variety of side-chain liquid crystalline polymers have been synthesized and characterized. However, the vast majority of these side-chain liquid crystalline polymers contain polymethylene units, i.e. $-(CH_2)_n-$ (n=1-14), as flexible spacers. So far, there are few examples of side-chain liquid crystalline polymers based on oxygen containing flexible spacers (i.e., oligooxyethylene). For more detailed information related to these side-chain liquid crystalline polymers, please refer to the following articles:

1. M. Engel, B. Hisgen, R. Keeler, W. Kreuder, B. Reck, H. Ringsdorf, H. W. Schmidt and P. Tschirner, "Synthesis, structure and properties of liquid crystalline polymers", *Pure & Appl. Chem.*, 57, 1009 (1985).
2. J. M. Rodriguez-Parada and V. Percec, "Poly(vinyl ether)s and poly(propenyl ether)s containing mesogenic groups: A new class of side-chain liquid-crystalline polymers", *J. Polym. Sci., Polym. Chem. Ed.*, 24, 1362 (1986).
3. V. Percec, J. M. Rodriguez-Parada, and C. Ericsson, "Synthesis and characterization of liquid crystalline poly(p-vinylbenyl ether)s", *Polym. Bull.*, 17, 347 (1987).
4. R. Duran and P. Gramain, "Synthesis and tacticity characterization of a novel series of liquid crystalline side chain polymers with oligo(ethylene oxide) spacers", *Makromol. Chem.*, 188, 2001 (1987).
5. R. Duran and C. Strazielle, "Molecular weights and solution properties of a series of side-chain liquid crystalline polymers with ethylene oxide spacers", *Macromolecules*, 20, 2853 (1987).
6. R. Duran, P. Gramain, D. Guillon and A. Skoulios, "Novel liquid crystals from side-chain polymers with oligoethyleneoxide spacers", *Mol. Cryst. Liq. Cryst., Lett.*, 3, 23 (1986).
7. S. G. Kostromin, V. P. Shibaev and N. A. Plate, "Thermotropic liquid-crystalline polymers XXVI. Synthesis of comb-like polymers with oxygen containing spacers and a study of their pphase transstions", *Liquid Crystals*, 2, 195 (1987).
8. C. Kim. and H. R. Allcock, "A liquid Crystalline poly(organophosphazene)", *Macromolecules*, 20, 1726 (1987).

Mr. Chain-Shu Hsu, who is one of the co-inventors of present invention, and V. Persec in their articles entitled "Synthesis and Characterization of Liquid Crystalline Polysiloxanes Containing Benzyl Ether Mesogens" *J. Polym. Sci., Polym. Chem. Ed.*, 25, 2909 (1987), and "Synthesis and Characterization of Liquid Crystalline Polyacrylates and Polymethacrylates Containing Benzyl ether and Diphenyl Ethane Based Mesogens" *J. Polym. Sci., Polym. Chem. Ed.*, 27, 453 (1989), disclose the synthesis and characterization of side-chain liquid crystalline polysiloxanes, polymethacrylates and polyacrylates containing benzyl ether and diphenyl ethane based mesogens. Because of the free rotation around the benzyl ether or ethylene bonds, these polymers represent the simplest class of liquid crystals containing mesogenic groups that present conformational isomerism. The phase behavior of these polymers showed that these kinds of mesogenic groups depress the tendency towards side chain crystallization behavior of the side-chain liquid crystalline polymers.

An object of the present invention is to provide ionic conducting polymer electrolytes which are prepared from alkali metal salts and side-chain liquid crystalline polysiloxanes containing oligooxyethylene spacers and benzyl ether based mesogenic groups. The polysiloxanes used in the present invention have very low glass transition temperatures, exhibit high mobility of the side chains at the mesophase, and form pseudocrown ether structure between the oligooxyethylene spacers, which in turn enhance the solubility of the alkali metal salts. As a result, the complexes formed by the polysiloxanes and alkali metal salts exhibit high ionic conductivities.

SUMMARY OF THE INVENTION

The present invention provides an ionic conducting polymer electrolyte which is a complex compound prepared from an alkali metal salt and a side-chain liquid crystalline polysiloxane of the formula

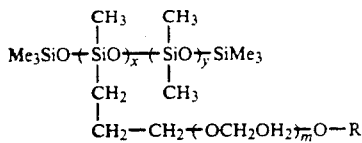

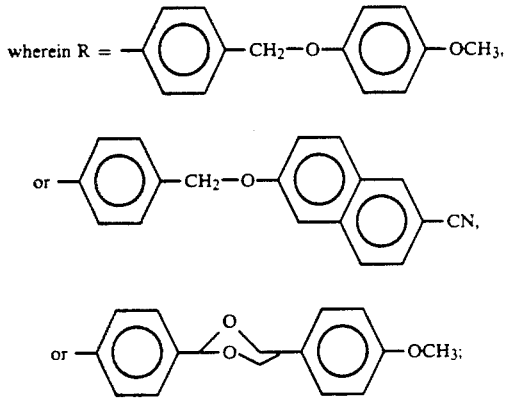

wherein Me=—CH$_3$; m is an integer of 1-5; x=10-100%, y=0-90%; and (polysiloxane backbone $\overline{Mw}$=1,000-15,000).

BRIEF DESCRIPTION OF THE DRAWINGS

FIGS. 9A, B are typical polarizing micrographs of the smectic texture: A) exhibited by polymer XI P (polymethylhydrogensiloxane $\overline{Mn}$=4500–5000) obtained after 24 hr annealing at 144° C. on cooling (magnification 500×), B) exhibited by polymer XI P (polymethylhydrogensiloxane $\overline{Mn}$=2270) obtained after cooling it to 160.9° C. from isotropic phase (magnification 800×);

DETAILED DESCRIPTION OF THE INVENTION

Figure 1:
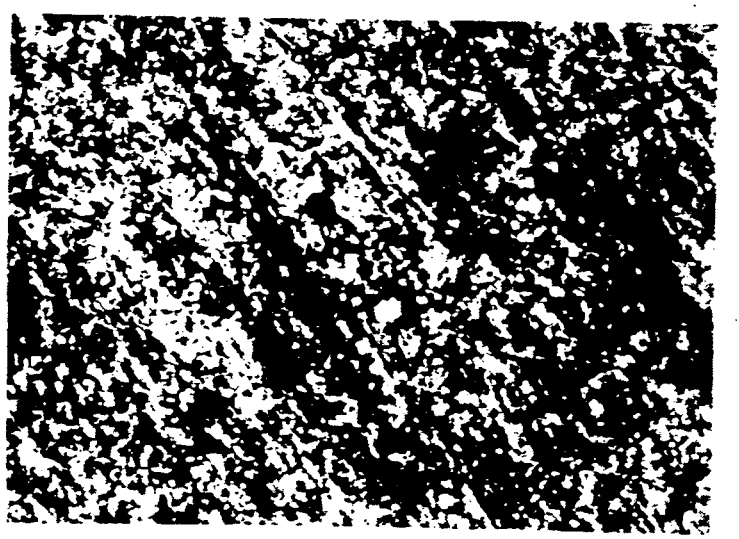
FIG. 1 is typical optical polarizing micrograph of monomer IV M (magnification 800×): smectic texture at 25° C. on cooling.

The present invention provides an ionic conducting polymer electrolyte which is a complex compound prepared from an alkali metal salt, such as LiSO$_3$CF$_3$, and a side-chain liquid crystalline polysiloxane containing oligo(oxyethylene) spacers and benzyl ether or 2,5-disubstituted-1,3-dioxane mesogens.

A process for forming this complex compound comprises dissolving the alkali metal salt and the side-chain liquid crystalline polysiloxane in a solvent to produce a homogenous solution; evaporating the solvent from the solution; and drying the residue under vacuum to obtain the complex compound.

Suitable alkali metal salts for using in the present invention, for example, includes LiSO$_3$CF$_3$, LiClO$_4$, LiCl, LiBr, NaClO$_4$, KClO$_4$ and the like.

As well known in the art, a metal salt is dissolved in the polymer matrix to form a complex which has ionic conducting property. The electrical conducting property mainly results from an ion transferring phenomenon existing in the matrix. We also have already known that the ion transferring phenomenon only takes place in the amorphous phase, and the main factors affecting this phenomenon are free volume existing in the polymer and chain mobility. Therefore, a suitable polymer should have 1) ability of dissolving metal salts, 2) an amorphous phase; 3) a lower glass transition temperature (Tg); and 4) a higher flexibility.

In the present invention, a polymer containing mesogen units is first used to prepare the polymer electrolyte. Because the mesophase is a phase between solid and liquid phase, it has the mobility of the liquid phase and the regularity of the solid phase. The mobility helps the ion transferring speed, and the regularity of one or two dimensions enhance the channel type transferring. Therefore, the polymer electrolyte according to present invention will have a higher conductivity. However, as the level of regularity of the mesogen increases, the mobility and the metal salt solubility will decrease. With the decrease of the mobility and metal salts solubility, the conductivity of the resulting complex also decreases. As a result, a desired polymer will contain mesogen units which have a suitable regularity and exhibit a high mobility of the side chains at the mesophase.

The side-chain liquid crystalline polysiloxane of the above formula (I) has a structure which comprises polysiloxane backbone, and mesogenic groups which are grafted to the backbone with oligo(oxyethylene) spacers. The side-chain liquid crystalline polysiloxane will exhibit both the polymer characteristics from the polymer backbone and the liquid crystalline properties from the mesogen units. The spacers connecting the mesogenic groups with the polymer backbone have a function of decoupling the motion of the polymer chain, and thus increase the mobility of the mesogen containing side chains. A longer spacer will have a better decoupling effect, however the length of the spacer is limited in order to depress the tendency towards side chain crystallization behavior. Generally the side-chain polymer tends to crystallize when the length of the spacer is longer than six methylene groups. Because the mesogenic groups used in the present invention present conformational isomerism which depress the tendency towards side chain crystallization behavior of the sidechain liquid crystalline polymers, there is no side chain crystallization even when the oligo(oxyethylene) spacers is relative long, i.e. —(O—C—C)-m; m=1-5. Additionally, the incorporation of oxygen atoms in spacer lead to the decrease of both Tg and isotropization temperature (Ti) of the side-chain liquid crystalline polymer. Moreover the oligo(oxyethylene) spacers form pseudocrown ether structure which will improve the metal salt solubility of the polymer (I). Therefore, a desired conductivity may be obtained from the complex compound formed by the polymer (I) and the alkali metal salt.

In one of the preferred embodiments of present invention side-chain crystalline polysiloxanes containing 6-cyano-2-naphthyl benzyl ether mesogen units and oligo(oxyethylene) spacers are incorporated with different stoichiomotries LiSO$_3$CF$_3$ respectively to form complexes having varied LiSO$_3$CF$_3$/ethylene oxide unit ratio. It is found that the formation of a homogenous phase for the complexes is approximately at the LiSO$_3$CF$_3$ to ethylene oxide ratio of ¼. The conductivities of these complexes are temperature dependent and exhibit the Arrhenius-type behavior, when the ratio ranges from 1/1-1/20.

A process for preparing the side-chain liquid crystalline polysiloxane of the formula (I) comprises forming an olefinic monomer containing a mesogenic group, and grafting this monomer onto the polysiloxane in the presence of an organic metal salt catalyst.

Suitable polysiloxanes for using in the present invention are those having a $\overline{Mn}$=400-15,000. Contemplated as the functional, or operative, equivalent of the polysiloxanes for purpose of this invention are the polymers which have a low Tg and high thermal stability.

The olefinic monomer containing a benzyl ether mesogen can be synthesized according to the route shown in Scheme 1, in which oligo(oxyethylene) spacers having different ethylene oxide units are connected to hydroxybenzaldehyde through an etherification reaction; the terminal hydroxyl group of the oligo(oxyethylene) is etherified with allyl bromide; the benzaldehyde is reduced to benzyl alcohol with sodium borohydride as the reductant, and then the benzyl alcohol is chlorinated to form benzyl chloride, finally the metal salt of 4-methoxyphenol or 6-cyano-2-naphthyl alcohol is reacted with the benzyl chloride to form the olefinic monomer.

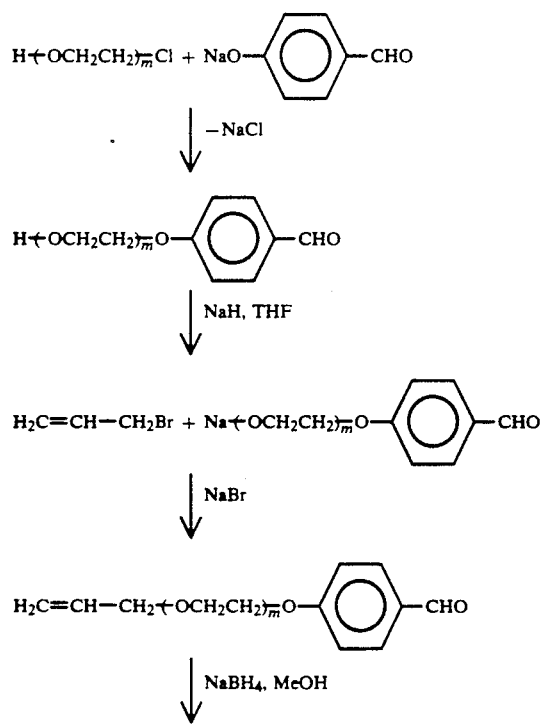

Scheme 1

Scheme 1

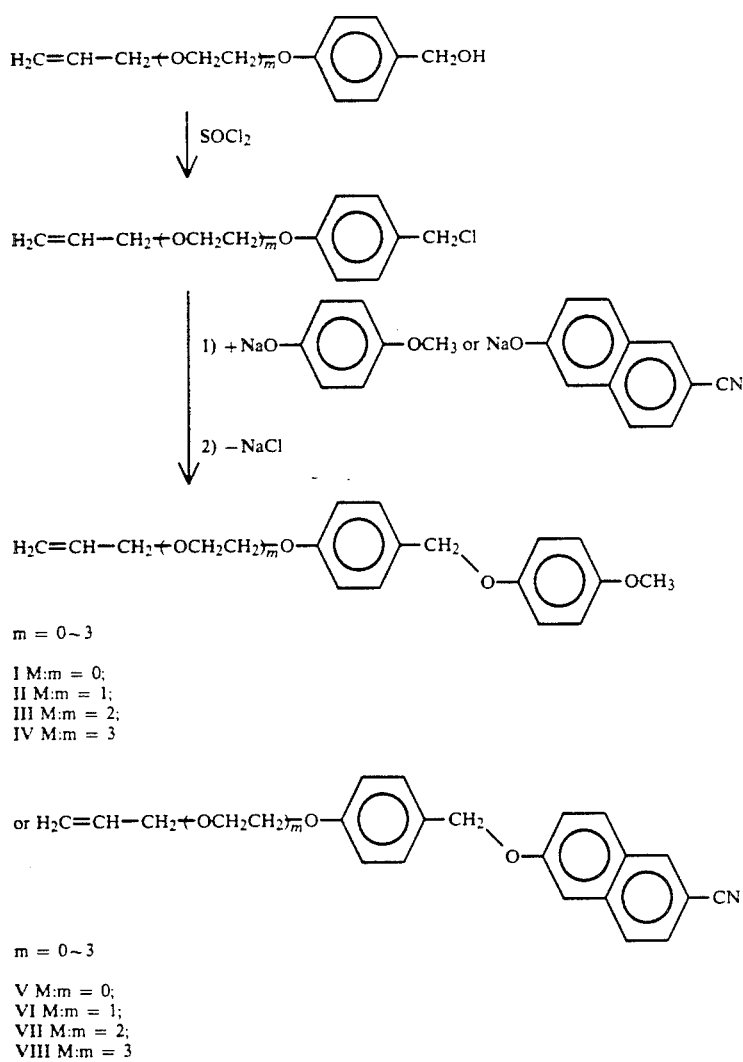

m = 0~3

I M:m = 0;
II M:m = 1;
III M:m = 2;
IV M:m = 3 m = 0~3

V M:m = 0;
VI M:m = 1;
VII M:m = 2;
VIII M:m = 3

The preparation of the olefinic monomer containing a 2,5-disubstituted-1,3-dioxane mesogen is shown in Scheme 2 and 3. 2-(p-methoxyphenyl)-propane-1,3-diol, which is used to prepare the mesogen containing monomer in Scheme 3, is synthesized according to the route shown in Scheme 2, wherein p-methoxy phenyl acetic acid is chlorinated such that the acid functional group is converted to acid chloride; then ethanol is introduced to undergo the esterification reaction, and ethyl p-methoxyphenylacetate is thus obtained; the ethyl p-methoxyphenylacetate in combination with sodium ethoxide undergo the Malonic esterification reaction with diethyl oxalate at 60° C., and then eliminate one CO molecule from the reaction product under 175° C. and 20 mmHg to obtain diethyl-2-(p-methoxyphenyl) malonate, finally lithium aluminum hydride is used as a reductant to reduce this malonate to 2-(p-methoxyphenyl)-propane-1,3-diol. In Scheme 3, the 2-(p-methoxyphenyl)-propane-1,3-diol and an aldehyde containing oligo(oxtethylene) spacer undergo a cyclization reaction under acidic and catalytic conditions. The resulting 2,5-disubstitued-1,3-dioxane containing monomers have cis- and trans-isomers, in which only the trans-isomer mesogen has liquid crystalline property. The trans-isomers are dominant in the products, because the reaction conditions are thermodynamically controlled conditions. Due to the solubility of the cis-isomer being higher than trans-isomer's, these two isomers can be separated by recrystallization technique.

Scheme 2

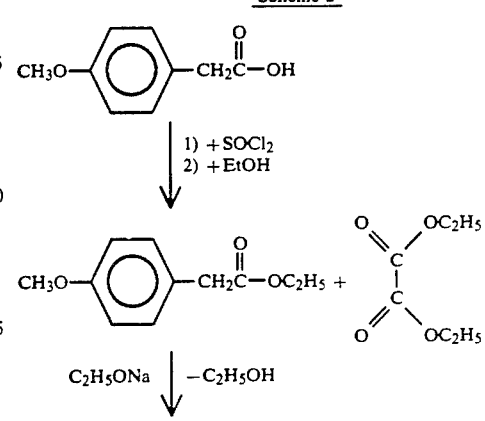

-continued
Scheme 2

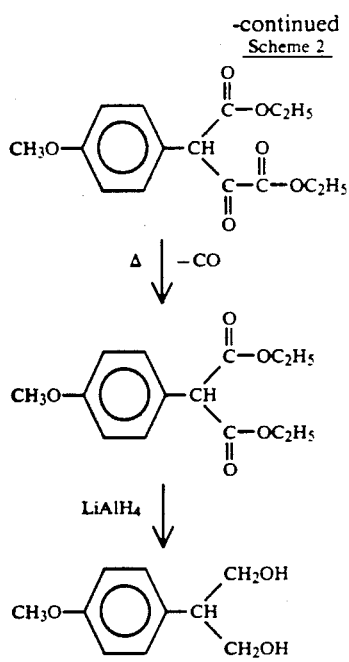

Materials

Poly(methylhydrogensiloxane) (PS122,$\overline{Mn}$=4500~5000; PS120,$\overline{Mn}$=2270) was obtained from Petarch Systems, Inc. and was used as received. Allyl bromide, 2-chloroethanol, 2-(2-chloroethoxy)ethanol, 2-[2-(2-chloroethoxy)ethoxy]ethanol, 4-hydroxybenzaldehyde and 6-bromo-2-naphthol (from Aldrich Co.) were used as received. Toluene used in the hydrosilation reaction was first refluxed over sodium and then distilled under nitrogen. Dicyclopentadienyl platinum (II) chloride catalyst was synthesized according to the method disclosed in the above-mentioned article in *Pure & Appl. Chem.*, 57, 1009 (1985).

The properties of solid polymer electrolytes with different stoichiometries were studied by using differential scanning calorimetry, optical polarized microscopy, X-ray diffraction and conductivity measurement, etc al. The techniques and apparatus involved are described as follows:

Techniques and Apparatus $^1$H-NMR spectra were recorded on a Jeol JNM-FX100 spectrometer. All spectra were recorded from CDCl$_3$ solution with TMS as internal standard unless otherwise noted. A Dupont 910 differential scanning calorimeter equipped with a 9900 computer system was used to determine the thermal transitions that were read at the maximum of their endothermic or exothermic peaks. In all cases, heating and cooling rates were 20°

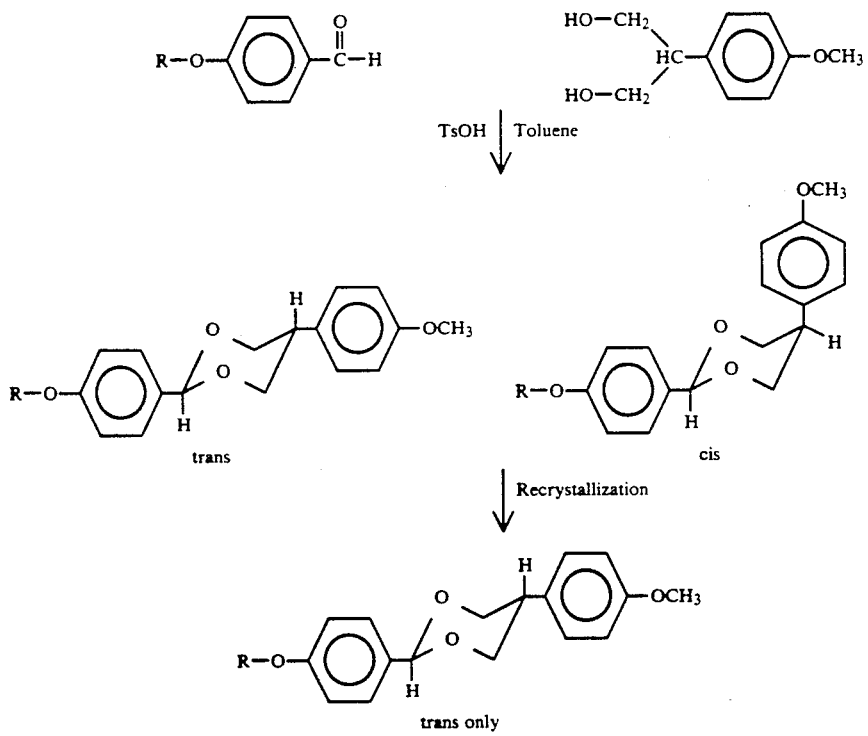

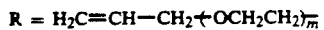

R = H$_2$C=CH—CH$_2$—(OCH$_2$CH$_2$)$_{\overline{m}}$
m = 0~3
IX M:m = 0;
X M:m = 1;
XI M:m = 2;
XII M:m = 3

The following examples illustrate the present invention and are not meant to be limiting.

The materials used in these examples are described as follows:

C./min unless otherwise specified. Glass transition temperatures (Tg) were read at the middle of the change in the heat capacity. After the first heating scan, the sample was "annealed" at about 10° C. above the isotropization temperature for 5~10 min. Under these registration conditions, beginning with the second heating and cooling scans, all the DSC scans gave perfectly reproducible data. The transition reported were read during the second or third heating scan and respectively cooling scan unless otherwise specified. A Nikon Microphot-FX optical polarized microscope equipped with a Mettler FP82 hot stage and a Mettler FP80 central processor was used to observe the thermal transitions and to analyze the anisotropic textures.

EXAMPLE 1

Synthesis of Side-Chain Liquid Crystalline Polysiloxanes Containing Benzyl Ether Based Mesogenic Groups a) Synthesis of Monomers:
4-(2-hydroxyethoxy)benzaldehyde (1),
4-[2-(2-hydroxyethoxy)ethoxy]benzaldehyde (2) and
4-{2-[2-(2-hydroxyethoxy)ethoxy]ethoxy}benzaldehyde (3)

All three compounds were synthesized by the same method. An example is presented below. To a sodium ethoxide solution prepared by dissolving cleanly cut sodium (4.62 g, 0.2 mol) in absolute ethyl alcohol (250 mL), 4-hydroxybenzaldehyde (24.5 g, 0.2 mol) was added. The ethanol was then completely evaporated in a rotavapor and the sodium salt of 4-hydroxybenzaldehyde was isolated. The dried sodium salt was immediately dissolved into N-methyl-2-pyrrolidinone (150 mL), and 2-(2-chloroethoxy)ethanol (25 g, 0.2 mol) was added. The resulting solution was stirred at 110° C. under a nitrogen atmosphere for 24 hr, cooled, filtered to remove the sodium chloride obtained, and the solvent was removed in a rotavopor. The residual oil was vacuum distilled at 145° C./4 mmHg to yield 26.8 g (71%) of a colorless oily product 2. $^1$H-NMR (CDCl$_3$, TMS, δ in ppm): 2.62 (s, 1H, —OH), 3.81–4.25 (m, 8H, —(O—CH$_2$—CH$_2$)—$_2$), 7.10 and 7.83 (2d, 4 aromatic protons), 9.86 (s, 1H, —CHO).

4-Allyloxy benzaldehyde (4)

To a sodium ethoxide solution prepared by dissolving cleanly cut sodium (2.3 g, 0.1 mol) in absolute ethanol (50 mL), 4-hydroxybenzaldehyde (12.2 g, 0.1 mol) was added. The ethanol was then completely evaporated in a rotavapor and the sodium salt of 4-hydroxybenzaldehyde was isolated. The dried sodium salt was immediately dissolved into N-methyl-2-pyrrolidinone (50 mL), and allyl bromide (12.1 g, 0.1 mol) was added. The resulting solution was stirred at 100° C. under nitrogen atmosphere for 24 hr, cooled, filtered to remove the sodium chloride obtained, and the solvent was removed in a rotavapor. The residue was vacuum distilled at 106° C./4 mmHg to yield 13.6 g (84%) of a colorless oily product. $^1$H-NMR (CDCl$_3$, TMS, δ in ppm): 4.62 (d, 2H, —CH$_2$—), 5.37 and 5.05 (m, 3H, CH$_2$=CH—), 7.01 and 7.81 (2d, 4 aromatic protons), 9.87 (s, 1H, —CHO).

4-(2-Allyloxyethoxy)benzaldephde (5),
4-[2-(2-allyloxyethoxy)ethoxy]benzaldehyde (6) and
4-{2-[2-(2-allyloxyethoxy)ethoxy]ethoxy}benzaldehyde (7)

All three compounds were prepared by the etherification of the corresponding alcohols with allyl bromide. An example is presented below. Sodium hydride (3.06 g, 0.128 mol) was suspended in dried THF (150 mL). The solution was bubbled with nitrogen and cooled to 0° C. 4-[2-(2-Hydroxyethoxy)ethoxy]benzaldehyde (26.8 g, 0.128 mol) was added dropwise to the solution. After the addition was completed, the resulting solution was stirred for 0.5 hr. Allyl bromide (23.2 g, 0.191 mol) was added. The reaction mixture was stirred at room temperature for 3 hr, acidified with 5% HCl aqueous solution (100 ml) and extracted with ethyl acetate. The collected organic phase was washed with 2% sodium bicarbonate aqueous solution, water, saturated sodium chloride solution, and dried over anhydrous MgSO$_4$. The solvent was evaporated in a rotavapor and the residual oil was vacuum distilled at 136° C./7 mmHg to yield 20 g (63%) of a colorless oily product 6. $^1$H-NMR (CDCl$_3$, TMS, δ in ppm): 3.56–4.27 (m, 10H, —CH$_2$—(O—CH$_2$—CH$_2$)—$_2$), 5.23 and 5.78 (m, 3H, CH$_2$=CH—), 7.05 and 7.77 (2d, 4 aromatic protons), 9.86 (s, 1H, —CHO).

4-Allyloxybenzyl alcohol (8),
4-(2-allyloxyethoxy)benzyl alcohol (9),
4-[2-(2-allyloxyethoxy)ethoxy]benzyl alcohol (10) and
4-{2-[2-(2-allyloxyethoxy)ethoxy]ethoxy}benzyl alcohol (11)

All four compounds were synthesized by reducing the corresponding benzaldehyde with sodium borohydride. An example is given below. A solution containing sodium borohydride (1.7 g, 0.045 mol) in 10 mL of 0.45N aqueous NaOH was added dropwise to a stirred mixture of 4-[2-(2-allyloxyethoxy)ethoxy]benzaldehyde (9.3 g, 0.037 mol) and methanol (300 mL). The resulting mixture was stirred at room temperature for 1 hr. Methanol was then evaporated, and water was added. The solution was acidified with dilute HCl aqueous solution and extracted with ethyl acetate. The organic layer was washed with 2% NaHCO$_3$ aqueous solution, water and saturated NaCl solution, and dried over anhydrous MgSO$_4$. After the solvent was evaporated, the residue was purified by column chromatography (silica gel, a mixture of 1:2 ethyl acetate to n-hexane as eluent) to yield 7.57 g (81%) of a colorless oily product 10. $^1$H-NMR (CDCl$_3$, TMS, δ in ppm): 2.18 (s, 1H, —OH), 3.54–4.16 (m, 10H, —CH$_2$—(O—CH$_2$—CH$_2$)—$_2$), 4.56 (s, 2H, Ph—CH$_2$—), 5.23 and 5.78 (m, 3H, CH$_2$=CH—), 6.71 and 7.20 (2d, 4 aromatic protons).

4-Allyloxybenzyl chloride (12),
4-(2-allyloxyethoxy)benzyl chloride (13),
4-[2-(2-allyloxyethoxy)ethoxy]benzyl chloride (14) and
4-{2-[2-(2-allyloxyethoxy)ethoxy]ethoxy}benzyl chloride (15)

All four compounds were prepared by the same method. An example is presented below. 4-[2-(2-Allyloxyethoxy)ethoxy]benzyl alcohol (7.57 g, 0.03 mol) was dissolved in methylene chloride (100 mL), and SOCl$_2$ (4.28 g, 0.036 mol) was added dropwise. After the addition was completed the reaction mixture was stirred at 40° C. for 1 hr. washed with water, 2% NaHCO$_3$ aqueous solution, and water and dried over anhydrous MgSO$_4$. The solvent was evaporated and the residual oil was purified by column chromatography (silica gel, a mixture of 1:3 ethyl acetate to n-hexane as eluent) to yield 6.52 g (80%) of a colorless oily product 14. $^1$H-NMR (CDCl$_3$, TMS, δ in ppm): 3.55–4.19 (m, 10H, —CH$_2$—(O—CH$_2$—CH$_2$)$_2$), 4.55 (s, 2H, Ph—CH$_2$—), 5.23 and 5.78 (m, 3H, CH$_2$=CH—), 5.92 and 7.25 (2d, 4 aromatic protons).

6-Cyano-2-naphthol (16)

Copper (I) cyanide (2.73 g, 0.03 mol) was added to a solution containing 5 g (0.022 mol) 6-bromo-2-hydroxynaphthalene in 25 ml of dry N-methyl-2-pyrrolidinone and refluxed at 200° C. under nitrogen for 1.5 h. The reaction mixture was cooled to 100° C., poured into a solution of iron(III) chloride (5.9 g) in water (91 ml) and concentrated hydrochloric acid (3.18 ml), and stirred at 60° C. for 30 min. The obtained mixture was extracted with ethyl ether. The ether layer was treated with charcoal, dried over anhydrous sodium sulfate, and then evaporated to dryness. The obtained solid was recrystallized from water to yield 2.04 g (54%) white solid. $^1$H-NMR (CDCl$_3$, TMS, δ in ppm): 5.60 (s, 1H, —OH), 7.10–8.07 (m, 6, aromatic protons).

4-Methoxyphenyl 4-allyloxybenzyl ether (I M),
4-Methoxyphenyl 4-(2-allyloxyethoxy)benzyl ether (II M),
4-Methoxyphenyl 4-[2-(2-allyloxyethoxy)ethoxy]benzyl ether (III M),
4-Methyoxyphenyl 4-{2-[2-(2-allyloxyethoxy)ethoxy]ethoxy}benzyl ether (IV M),
6-Cyano-2-naphthyl 4-allyloxybenzyl ether (V M),
6-Cyano-2-naphthyl 4-(2-allyloxyethoxy)benzyl ether (VI M),
6-Cyano-2-naphthyl 4-[2-(2-allyloxyethoxy)ethoxy]benzyl ether (VII M) and
6-Cyano-2-naphthyl 4-{2-[2-(2-allyloxyethoxy)ethoxy]ethoxy}benzyl ether (VIII M)

All of the monomers listed above were synthesized by the same method. An example is presented below. Cleanly cut sodium (0.35 g, 0.015 mol) was dissolved in absolute ethanol (50 mL). After sodium was dissolved, 4-methoxyphenol was added all at once. The ethanol was removed by a rotavapor to form the sodium salt of 4-methoxyphenol, and dried N-methyl-2-pyrrolidinone (50 mL) were added into the same flask. When the sodium salt of 4-methoxyphenol was completely dissolved, 4-[2-(2-allyloxyethoxy)ethoxy]benzyl chloride (4.14 g, 0.015 mol) was added. The reaction mixture was stirred at 110° C. under nitrogen atmosphere for 24 hr and cooled. N-Methyl-2-pyrrolidinone was distilled under vacuum. The residue was dissolved in ethyl acetate (200 mL). The ethyl acetate solution was washed with 5% NaOH aqueous solution, water and saturated NaCl solution, and dried over anhydrous MgSO$_4$. The ethyl acetate was evaporated, and the crude product was recrystallized from methanol to yield 4.0 g (73%) of white crystals (III M) Table I summarizes the chemical shifts of all synthesized monomers.

TABLE 1

Characterization of benzyl ether monomers.

| Compound | 100MHz $^1$H-NMR (CDCl$_3$, δ, ppm) |
|---|---|
| I M | δ = 3.69(s,3H,—OCH$_3$), 4.47(d,2H,—CH$_2$—CH=CH$_2$), 4.86(s,2H,Ph—CH$_2$), 5.32 and 6.03 (m,3H,—CH=CH$_2$), 6.78–7.30 (m,8 aromatic protons). |
| II M | δ = 3.68(s,3H,—CH$_3$), 3.73(d,2H,—CH$_2$—CH=CH$_2$), 3.97–4.11(m,4H,O—CH$_2$—CH$_2$—), 4.85(s,2H,Ph—CH$_2$), 5.29 and 5.91(m,3H,—CH=CH$_2$), 6.77–7.29(m,8 aromatic protons). |
| III M | δ = 3.67(s,3H,—OCH$_3$), 3.48–4.11(m,10H, CH$_2$–(O—CH$_2$—CH$_2$)$_2$), 4.85(s,2H,Ph—CH$_2$), 5.15 and 5.72(m,3H,—CH=CH$_2$), 6.78–7.20 (m, 8 aromatic protons). |
| IV M | δ = 3.76(s,3H,—OCH$_3$), 3.63–4.19(m,14H, CH$_2$–(O—CH$_2$—CH$_2$)$_3$), 4.93(s,2H,Ph—CH$_2$), 5.23 and 5.89(m,3H,—CH=CH$_2$), 6.87–7.28(m,8 aromatic protons). |
| V M | δ = 4.50(d,2H,—CH$_2$—CH=CH$_2$), 5.05(s,2H, Ph—CH$_2$), 5.28 and 6.04(m,3H,—CH=CH$_2$), 6.84–8.06(m,10 aromatic protons). |
| VI M | δ = 3.75(d,2H,—CH$_2$—CH=CH$_2$), 4.00–4.13(m,4H, —O—CH$_2$—CH$_2$—), 5.04(s,2H,Ph—CH$_2$), 5.31 and 5.91(m,3H, —CH=CH$_2$), 6.84–8.06 (m,10 aromatic protons). |
| VII M | δ = 3.51–4.12(m,10H,CH$_2$–(O—CH$_2$—CH$_2$)$_2$), 5.03 (s,2H,Ph—CH$_2$), 5.26 and 5.88(m,3H, —CH=CH$_2$), 6.82–8.03(m, 10 aromatic protons). |
| VIII M | δ = 3.49–4.12(m,14H,CH$_2$–(O—CH$_2$—CH$_2$)$_3$), 5.04 (s,2H,Ph— CH$_2$), 5.26 and 5.85(m,3H,—CH=CH$_2$), 6.83–8.05(m,10 aromatic protons). |

Scheme 1 outlines the synthetic procedure used to prepare the monomers I M to VIII M. As described in the Synthesis part, each reaction step was accomplished with pretty high yields and the monomers were obtained in high purity as determined by $^1$H-NMR spectroscopy and thin layer chromatography. Table 2 summarized the thermal transitions and the thermodynamic parameters of the monomers. All the monomers except I M and VI M present one thermal transition. FIG. 1 represents the typical smectic texture exhibited by monomer IV M.

TABLE 2

Thermal transitions and thermodynamic parameters of benzyl ether monomers.

| Monomer type | m$^b$ | Thermal transitions (°C.) and thermodynamic parameters, ΔH (Kcal/mru)$^a$; ΔS (cal/mru °K)$^a$ Heating | | | |
|---|---|---|---|---|---|
| | | T$_1$ | ΔH$_1$/ΔS$_1$ | T$_2$ | ΔH$_2$/ΔS$_2$ |
| I M | 0 | 76 | 2.51/7.19 | 90 | 3.55/9.78 |
| II M | 1 | 71 | 5.69/16.54 | — | —/— |
| III M | 2 | 53 | 6.82/20.92 | — | —/— |
| IV M | 3 | 38 | 6.07/19.52 | — | —/— |
| V M | 0 | 153 | 8.99/23.78 | — | —/— |
| VI M | 1 | 96 | 4.70/12.94 | 101 | 5.57/14.90 |
| VII M | 2 | 76 | 10.68/30.61 | — | —/— |
| VIII M | 3 | 66 | 11.08/32.69 | — | —/— |

$^a$mru = mole repeat unit.
$^b$m according to Scheme 1.

b) Synthesis of Side-Chain Liquid Crystalline Polysiloxanes:

A general procedure for synthesizing liquid crystalline polysiloxanes is described below. 1.0 g (10 mol % excess versus the Si—H groups present in polysiloxane) of the olefinic derivative was dissolved in 100 mL of dry, freshly distilled toluene together with the proper amount of poly(methylhydrogensiloxane). The reaction mixture was heated to 110° C. under nitrogen, and 100 μg of dicyclopentadienyl platinum (II) chloride catalyst was then injected with a syringe as methylene chloride solution (1 mg/mL). The reaction mixture was refluxed at 110° C. under nitrogen for 24 hr. After this reaction time both IR and $^1$H-NMR analysis showed that the hydrosilation reaction was complete. The solution was cooled and filtered. The white polymers were separated by precipitation in methanol, purified by several reprecipitations from chloroform solutions into methanol until the thin layer chromatography analysis showed no existence of unreacted monomers. The polymers were then dried under vacuum.

Table 3 summarizes the thermal transitions and thermodynamic parameters of the synthesized polymers. All the polymers present liquid crystalline mesophases.

Figure 2:
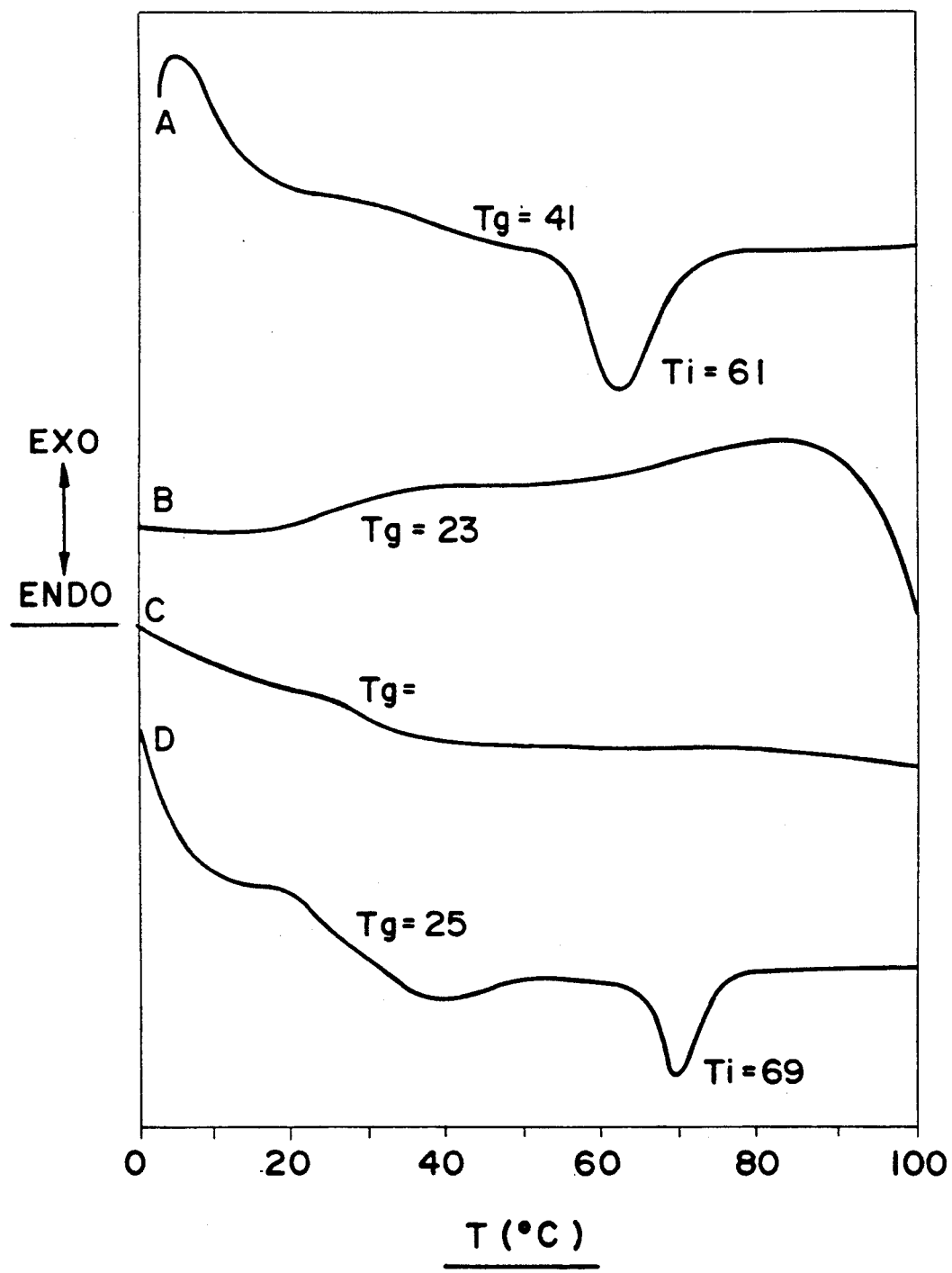
FIG. 2 is a Differential Scanning Calorimeter (DSC) thermograms (20° C./min) for polymer I P: A) first heating scan, B) first cooling scan, C) second heating scan, D) third heating scan obtained after 24 hr annealing at 56° C.

FIG. 2 presents the representative DSC heating and cooling traces of polymer I P. On the first heating scan, it shows a glass transition temperature (Tg) at 41° C. followed by a liquid crystalline mesophase which undergoes isotropization at 61° C. Nevertheless, on cooling from above the isotropization temperature, it only preesents one Tg on cooling and subsequent heating scans. The reason could be that the mesogenic group is flexible and undergoes free rotation about —C—O— bond leading to a number of different conformational isomers. In addition, the spacer is too short for the mesogenic group to reform the most stable conformer, i.e., anti one, which is the only conformer that can form mesophase. This phenomenon agrees with the results that have been demostrated in a previously-mentioned publication entitled "Synthesis and Characterization of Liquid Crystalline Polyacrylates and Polymethacrylates Containing Benzyl Ether and Diphenyl Ethane Based Mesogens".

Figure 3:
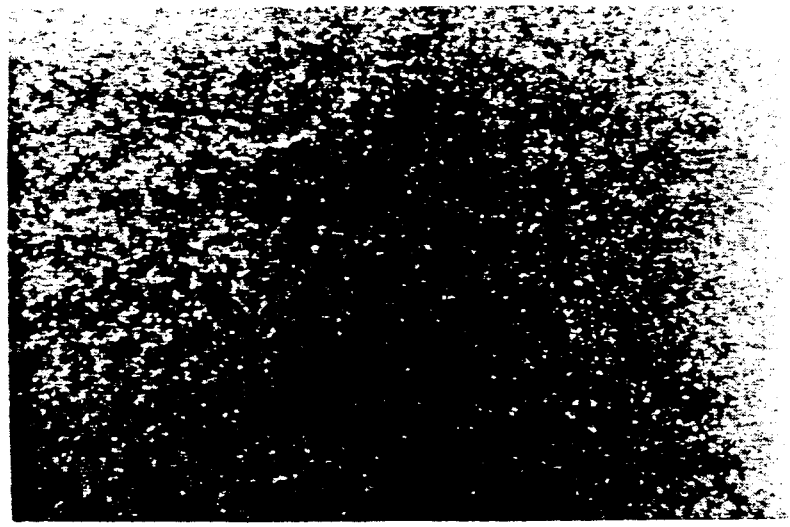
FIG. 3 is a typical optical polarizing micrograph of polymer IV P (magnification 800×): smectic texture at 25° C. on cooling.
Figure 4:
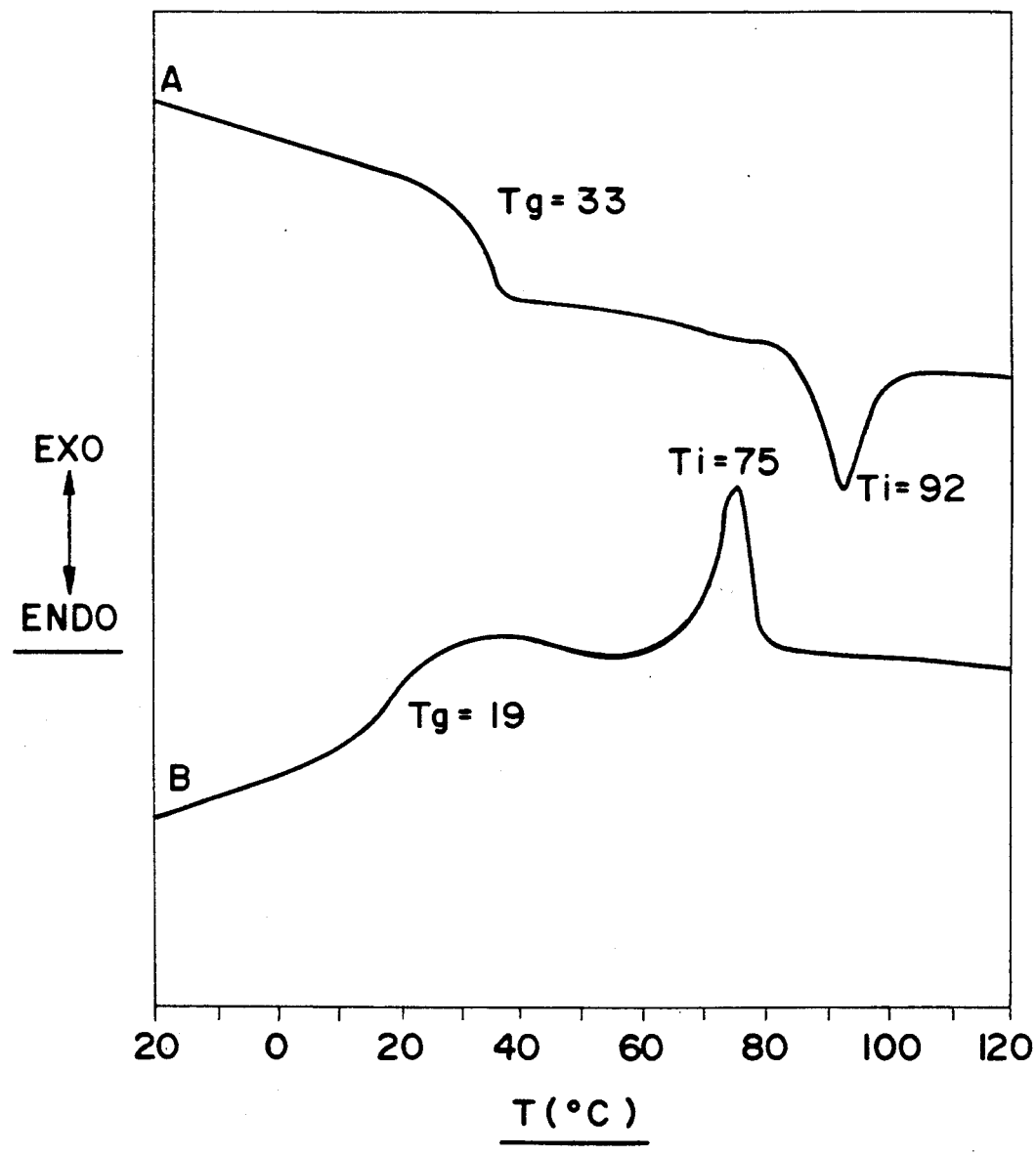
FIG. 4 is a DSC thermograms (20° C./min) for polymer VII p: A) second heating scan, B) cooling scan.
Figure 5:
FIG. 5 is a typical optical polarizing micrograph of polymer V P (magnification 800×): smectic A focal-conic fan texture at 100° C. on Cooling.

Both polymers II P and III P exhibit monotropic liquid crystalline mesophases while polymer IV P displays an enantiotropic mesophase. All polymers I P to IV P present smectic mesomophism. FIG. 3 shows a representative optical micrograph of polymer IV P. Polymers V P to VIII P exhibit enantiotropic liquid crystalline mesophases. Representative DSC traces of polymer VII P are shown in FIG. 4. Both heating and cooling scans display Tg and one liquid crystalline mesophase. FIG. 5 shows the typical focal-conic texture of the $S_A$ mesophase of polymer V P.

Table 4 presents the side-chain liquid crystalline polymers with oligooxyethylene units in the spacer and compares them to analogous polymers with only polymethylene units in the spacer. According to their thermal transition temperatures, we can conclude that the introduction of oxygen into the flexible spacer decreases both the glass transition and the isotropization temperatures of the side-chain liquid crystalline polymers. However, according to the results reported in this invention, the nature of the mesophases exhibited by these polymers seems to be dictated by the spacer length and mesogenic group and apparently is not influenced by the paraffinic or oligooxyethylenic nature of the flexible spacer.

In conclusion, all of the synthesized polymers show only liquid crystalline mesophases and do not undergo side chain crystallization even if the very long spacers containing oligooxyethylene units were used to connect the polymer backbone and the mesogenic units. This result must be due to the mesogenic units which exhibit conformational isomerism. On the other hand, the nature of the spacer plays quite important role on a side-chain liquid crystalline polymer. It is shown that the incorporation of oxygen atoms in spacer lead to the decrease of both glass transition and isotropization temperatures.

TABLE 3

Thermal transitions and thermodynamic parameters of polymers.

| | | | Thermal Transitions, (°C.) and Thermodynamic Parameters, $\Delta H(Kcal/mru)^a$, $\Delta S(cal/mru \cdot K)^a$ | | | | |
|---|---|---|---|---|---|---|---|
| Polymer type | $m^b$ | $T_g$ | Heating | | | Cooling | |
| | | | $T_1$ | $T_i$ | $\Delta H_i/\Delta S_i$ | $T_i$ | $\Delta H_i/\Delta S_i$ |
| I P | 0 | 41 | — | 61 | 0.84/2.51 | — | —/— |
| II P | 1 | −29 | 61 | 70 | 2.81/—$^c$ | 53 | 2.03/6.25 |
| III P | 2 | −36 | 70 | 77 | 3.60/—$^c$ | 43 | 2.72/8.61 |
| IV P | 3 | −42 | — | 66 | 2.86/8.44 | 35 | 2.94/9.54 |
| V P | 0 | 57 | — | 127 | 0.37/0.92 | 105 | 0.42/1.10 |
| VI P | 1 | 42 | — | 110 | 0.45/1.18 | 99 | 0.42/1.14 |
| VII P | 2 | 33 | — | 92 | 0.48/1.31 | 75 | 0.46/1.32 |
| VIII P | 3 | 18 | — | 51 | 0.34/1.06 | 35 | 0.29/0.95 |

$^a$mru = mole repeat unit.
$^b$m according to Scheme 1.
$^c$overlapped transitions, $\Delta H_t = \Delta H_1 + \Delta H_i$

TABLE 4

Comparison of side-chain polysiloxanes with oligooxyethylene units and polymethylene units in the spacer.

| Polymer Backbone and Spacer | Interconnecting Group and Mesogen | Phase Transitions (°C.) | Reference |
|---|---|---|---|
| $CH_3$<br>\|<br>$+Si-O+_{80}$<br>\|<br>$CH_2$<br>\|<br>$CH_2-CH_2+OCH_2CH_2+_3$ | $-O-⟨⟩-CH_2\diagdown_{O-⟨⟩-OCH_3}$ | g −42  S  66  i | This study |
| $CH_3$<br>\|<br>$+Si-O+_{80}$<br>\|<br>$CH_2$<br>\|<br>$CH_2+CH_2+_9$ | $-O-⟨⟩-CH_2\diagdown_{O-⟨⟩-OCH_3}$ | g 30.5  S  92  S  119 i | a) |
| $CH_3$<br>\|<br>$+Si-O+_{80}$<br>\|<br>$CH_2$<br>\|<br>$CH_2-CH_2+OCH_2CH_2+_3$ | $-O-⟨⟩-CH_2\diagdown_{O-⟨⟩⟨⟩-CN}$ | g 18  $S_A$  51  i | This study |

TABLE 4-continued

Comparison of side-chain polysiloxanes with oligooxyethylene units and polymethylene units in the spacer.

| Polymer Backbone and Spacer | Interconnecting Group and Mesogen | Phase Transitions (°C.) | Reference |
|---|---|---|---|
| $\left(\text{Si}-\text{O}\right)_{80}$ with CH$_3$, CH$_2$, CH$_2$(CH$_2$)$_9$ | —O—⟨⟩—CH$_2$—O—⟨⟩—⟨⟩—CN | g  19  S$_A$  163.5  i | a) | g = glassy
S: smectic
i: isotropic
a) Chain-Shu Hsu and V. Percec, J. Polym Sci., Polym. Chem. Ed., 27, 20 453 (1989).

EXAMPLE 2

Synthesis of Side-Chain Liquid Crystalline Polysiloxanes Containing 2,5-Disubstituted-1,3-Dioxane Based Mesogenic Groups a) Synthesis of Monomers:

Scheme 2 and 3 show the synthetic route for olefinic monomers containing 2,5-disubstituted-1,3-dioxane based mesogenic goups.

Ethyl p-methoxyphenylavetate (18)

To a p-methoxyphenyl acetic acid solution prepared by dissolving p-methoxyphenyl acetic acid (83.09 g, 0.5 mol) in dichloro methane (240 mL), SOCl$_2$ (43.5 ml, 0.2 mol) was added dropwise at room temperature. The resulting solution was refluxed at 38° C. for 3 hr, and then absolute ethanol (100 ml, 2.2 mol) was introduced dropwise. The mixture was allowed to react at room temperature for one hr. Saturated ammonium chloride (20 ml) was added to the reaction mixture, and extracted with ethyl acetate (3×100 ml). The organic layer was removed and washed with NaHCO$_3$ aqueous solution (2%, 20 ml), water (20 ml) and saturated NaCl solution (20 ml), dried, and filtered. After the solvent was evaporated from the filtrate, an oily product (87.2 g) was obtained. The residual oil was vacuum distilled at 84° C./1 mmHg to yield 86.66 g (89%) of a colorless oily product 18. $^1$H-NMR (CDCl$_3$, TMS, δ in ppm): 1.25 (t, 3H, —CH$_2$—CH$_3$), 3.55 (s, 2H, Ph—CH$_2$—), 3.79 (s, 3h, —O—CH$_3$), 4.14 (q, 2H, —O—CH$_2$—CH$_3$), 6.85 and 7.20 (q, 4 aromatic protons).

Diethyl-2-p-methoxyphenylmalonate (19)

In a 500 ml flask, sodium (10.50 g, 0.46 mol) was dissolved in 250 ethanol. The solution was heated and remained at 60° C. 66.73 g (0.46 mol) diethyl oxalate which was purified by distillation and dried over K$_2$CO$_3$ was added to the heated solution, and immediately following this addition the reactant 18 (88.66, 0.64 mol) was also added. The resulting solution was poured into a 500 ml beaker, and after stirring for 10–15 min. the solution started precipitating. After 100 ml ethyl ether was introduced, the mixture was cooled and filtered to separate the precipitated solid. The solid was dissolved in 225 ml sulfuric acid (26 ml) aqueous solution. The organic layer was removed. The aqueous layer was extracted with ethyl ether (2×200 ml) and the ether layer was combined with the organic layer. This combined organic layer was then washed with NaHCO$_3$ aqueous solution (2%, 20 ml), water (20 ml) and saturated NaCl solution, dried, filtered and concentrated to obtain a oily product. The oily product was reacted at 175° C./20 mmHg for 3 hr to remove one CO molecule. The residue was vacuum distilled at 129° C./5 mmHg to yield 104 g (85%) of a colorless liquid product 19. $^1$H-NMR (CDCl$_3$, TMS, δ in ppm): 1.26 (t, 6H, —CH$_2$—CH$_3$), 3.79 (s, 3H, —O—CH$_3$), 4.20 (q, 4H, —O—CH$_2$—CH$_3$), 4.55 (s, 1H, Ph—CH—), 6.87 and 7.32 (q, 4 aromatic protons).

2-(p-Methoxyphenyl)-propane-1,3-diol (20)

LiAlH$_4$ (5.75 g, 0.15 mol) was suspended in ethyl ether (150 mL), and into this suspension solution compound 19 (16.85 g, 0.10 mol) dissolved in 50 ml ethyl ether was added dropwise. The resulting solution was stirred at 40° C. for 40 hr, and cooled in ice bath, and ethyl ether (15 ml) was introduced dropwise to destroy the excess LiAlH$_4$ remaining in the solution. After the addition was completed, the resulting solution was added with 200 ml HCl aqueous solution (HCl/H$_2$O, 1:2) and stirred for one hr. The organic phase was removed. The aqueous phase was extracted with ethyl ether (2×200 ml). The ether layer was combined with the collected organic phase, and then was washed with NaHCO$_3$ aqueous solution (2%, 20 ml), water (20 ml), saturated sodium chloride solution (20 ml), dried, and filtered. The residual was recrystallized from benzene to yield 12 g (66%) product 20. $^1$H-NMR (CDCl$_3$, TMS, δ in ppm): 2.17 (s, 2H, —OH), 3.08 (m, 1H PhCH), 6.82 and 7.13 (q, 4 aromatic protons).

2-(p-Allyloxyphenyl)-5-(p-methoxyphenyl)-1,3-dioxane (IX M),

2-[p-(2-allyloxyethoxy)phenyl)]-5-(p-methoxyphenzyl)-1,3-dioxane (X M),

2-[p-(2-(2-allyloxyethoxy)ethoxy)phenyl)]-5-(p-methoxyphenzyl)-1,3-dioxane (XI M), and 2-[p-2(2-(2-(2-allyloxyethoxy)ethoxy)ethoxy)-phenyl)]-5-(p-methoxyphenzyl)-1,3-dioxane (XII M), All of the monomers listed above were synthesized by the same method. An example is presented below. In a 250 ml flask, Compound 6 (6.88 g, 0.028 mol) and the diol 20 was dissolved in benzene (100 mL). Catalytic amount of p-toluenesulfonic acid was added into the same flask, and the content was heated and refluxed until 504 mg water was collected in a Dean-Strak trap. The residue was cooled and washed with 2% NaHCO$_3$ aqueous solution (20 ml), water (20 ml) and saturated NaCl solution (20 ml), dried, filtered, and concentrated. The residue was recrystallized with benzene/hexane (1:5) to yield 7.74 g (62%) of white solid product (XI M). Table 5 summarizes the chemical shifts of all synthesized monomers.

TABLE 5

Characterization of 2,5-disubstituted-1,3-dioxane monomers.

| Compound | 100 MHz $^1$H-NMR (CDCl$_3$, δ, ppm) |
|---|---|
| IX M | δ = 3.29 (m,1H, —CH(CH$_2$)$_2$—), |

TABLE 5-continued

Characterization of 2,5-disubstituted-1,3-dioxane monomers.

| Compound | 100 MHz $^1$H-NMR (CDCl$_3$, δ, ppm) |
|---|---|
|  | 3.79 (s, 3H, —OC$\underline{H}_3$), 3.86–4.40 (m, 4H, —CH(C$\underline{H}_2$)$_2$—), 4.55 (d, 2H, —C$\underline{H}_2$—CH=CH$_2$), 5.52 (s, 1H, —C$\underline{H}$ (OCH$_2$)$_2$—), 5.31 and 5.97 (m, 3H, —CH$_2$—C$\underline{H}$=C$\underline{H}_2$), 6.83–7.49 (m, 8 aromatic protons). |
| X M | δ = 3.29 (m, 1H, —C$\underline{H}$(CH$_2$)$_2$—), 3.79(s, 3H, —OC$\underline{H}_3$), 3.75–4.40 (m, 10H, —CH(C$\underline{H}_2$)$_2$— and —CH$_2$—O—C$\underline{H}_2$—C$\underline{H}_2$—), 5.52 (S, 1H, —C$\underline{H}$(OCH$_2$)$_2$—) 5.26 and 5.81 (m, 3H, —CH$_2$—C$\underline{H}$=C$\underline{H}_2$), 6.83–7.49(m, 8 aromatic protons). |
| XI M | δ = 3.29 (m, 1H, —C$\underline{H}$(CH$_2$)$_2$—), 3.79(s, 3H, —OC$\underline{H}_3$), 3.61–4.40 (m, 14H, —CH(C$\underline{H}_2$)$_2$— and —CH$_2$ (O—C$\underline{H}_2$—C$\underline{H}_2$)$_2$—), 5.51 (s, 1H, —C$\underline{H}$(OCH$_2$)$_2$—), 5.18 and 5.86 (m, 3H, —CH$_2$—C$\underline{H}$=CH$_2$), 6.82–7.48 (m, 8 aromatic protons). |
| XII M | δ = 3.29 (m, 1H, —C$\underline{H}$(CH$_2$)$_2$—), 3.79 (s, 3H, —OC$\underline{H}_3$), 3.62–4.39 (m, 18H, —CH(C$\underline{H}_2$)$_2$— and —CH$_2$(O—C$\underline{H}_2$—C$\underline{H}_2$)$_3$—), 5.51 (S, 1H, —C$\underline{H}$(OCH$_2$)$_2$—), 5.19 and 5.86 (m, 3H, —C$\underline{H}$(OCH$_2$)$_2$—), —C$\underline{H}_2$—C$\underline{H}$=C$\underline{H}_2$), 6.82–7.47 (m, 8 aromatic protons). |

As described in the Synthesis part, each reaction step was accomplished with pretty high yields and the monomers were obtained in high purity as determined by $^1$H-NMR spectroscopy, thin layer chromatography and HPLC. Table 6 summarizes the thermal transitions and the thermodynamic parameters of the monomers. All the monomers exhibit the Nematic liquid crystalline mesophase.

TABLE 6

Thermal transitions and thermodymanic parameters of 2,5-disubstituted-1,3-dioxane monomers.

Thermal Transitions, (°C.) and Thermodynamic Parameters, ΔH(kcal/mru)$^a$, ΔS(cal/mru)$^a$

| Monomer type | m$^b$ | Heating T$_1$ ΔH$_1$/ΔS$_2$ | T$_2$ ΔH$_2$/ΔS$_2$ | T$_3$ ΔH$_3$/ΔS$_3$ | T$_i$ ΔH$_i$/ΔS$_i$ |
|---|---|---|---|---|---|
| IX M | 0 | 119 / 134/3.42 | 129 / 4.20/10.43 | 135 / 2.26/5.54 | 171 / 0.25/0.55 |
| X M | 1 | 69 / 3.64/10.65 | 94 / 2.83/7.70 | 98 / 1.83/4.93 | 129 / 0.21/0.52 |
| XI M | 2 | 47 / 4.82/15.03 | 71 / 3.05/8.85 | 78 / 1.54/4.38 | 96 / 0.15/0.41 |
| XII M | 3 | −10 / 2.83/—$^c$ | −3 / — | 45 / 2.50/—$^d$ | 61 / — |

$^a$mru = mole repeat unit.
$^b$m according to Scheme 3.
$^c$overlapped transitions, ΔH$_1$ = ΔH$_1$ + ΔH$_2$
$^d$overlapped transitions, ΔH$_3$ = ΔH$_3$ + ΔH$_i$ b) Synthesis of Side-Chain Liquid Crystalline Polysiloxanes:

The procedure for synthesizing liquid crystalline polysiloxanes is generally the same as the procedure described in above Example 1.

Figure 6A:
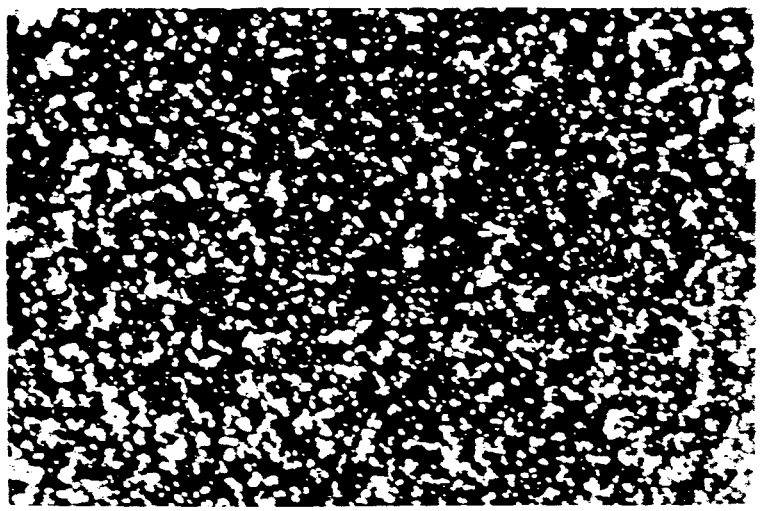
FIGS. 6A, B are typical optical polarizing micrographs (magnification 500×) of the smectic textures exhibited by polymer IX P obtained A) after 24 hr annealing at 211.1° C. on cooling, B) after 10 min annealing at 30° C. on cooling.
Figure 6B:
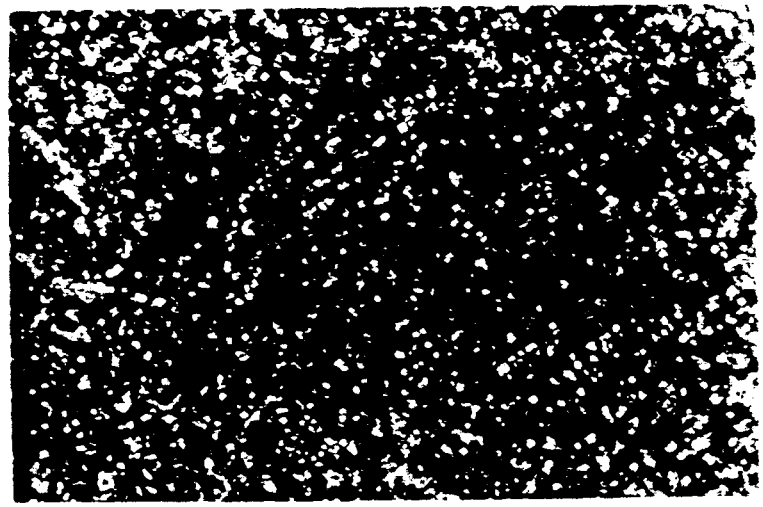

The side-chain liquid crystalline polysiloxanes were characterized by differential scanning calorimetry and optical polarized microscope. Table 7 summarizes the thermal transitions and thermodynamic parameters of the synthesized polymers. All the polymers present smectic liquid crystalline mesophases. Polymer IX P displays an enantiotropic liquid crystalline mesophase. FIGS. 6A and 6B are typical optical polarizing micrographs of the smectic textures exhibited by polymer IX P, wherein 6A was obtained after 24 hr annealing at 211.1° C. on cooling, and 6B was obtained after 10 min annealing at 30° C. on cooling.

Figure 7:
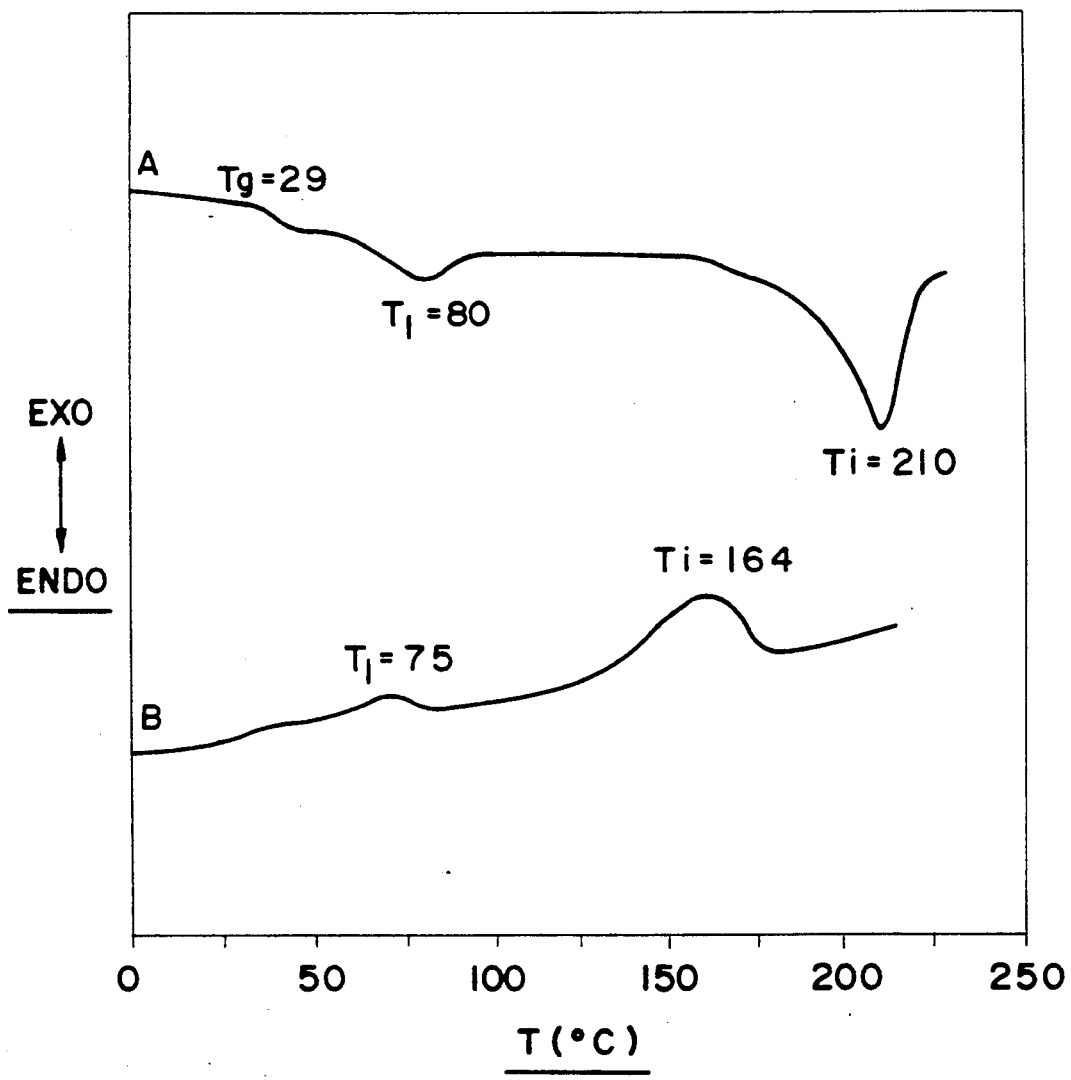
FIG. 7 is a DSC thermogram (10° C./min) for polymer X P: A) second heating scan, B) cooling scan.
Figure 8A:
FIGS. 8A, B are typical polarizing micrographs of the smectic texture exhibited by polymer X P obtained: A) after 24 hr annealing at 199.9° C. on cooling (magnification 500×), B) after 10 min annealing at 119.2° C. on cooling (magnification 800×)
Figure 8B:
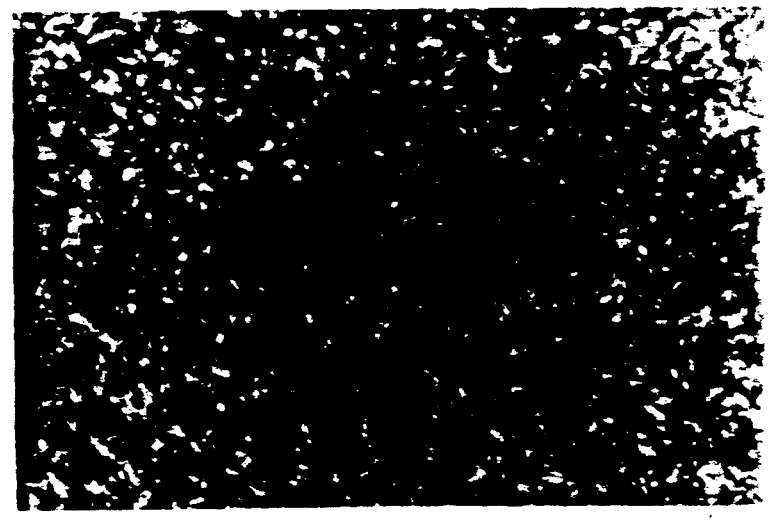

Polymers X P, XI P and XII P display two enantiotropic mesophases. FIG. 7 presents the representative DSC heating and cooling traces of polymer X P, which show polymer X P has one Tg and two mesophases. FIGS. 8A and 8B show representative optical micrographs of polymer X P. Polymer X P exhibits batonnet S$_A$ texture after 24 hr annealing at 199.9° C. on cooling in FIG. 8A, and exhibits smectic texture after 10 min annealing at 119.2° C. on cooling in FIG. 8B.

FIG. 9A shows that polymer XI P exhibit batonnet S$_A$ texture. FIG. 9B shows a polarizing micrograph of a side-chain liquid crystalline polymer which is similar to polymer XI P except a lower molecular weight polysiloxane (PS120, Petarch System, Inc., $\overline{M_n}$=2270) is used. In addition the data of Table 7 show that this lower molecular weight side-chain liquid crystalline polymer has a lower Tg and thermal transition temperature, FIG. 9B exhibits a typical focal-conic S$_A$ mesophase texture. Therefore, we can conclude that a lower molecular weight polymer backbone is helpful in forming a liquid crystalline mesophase.

TABLE 7

Thermal transitions and thermodymanic Parameters pf polymers

Thermal Transitions, (°C.) and Thermodynamic Parameters, ΔH(kcal/mru)$^a$, ΔS(cal/mru °K.)$^a$

| Polymer type | m$^b$ | T$_g$ | Heating T$_1$ ΔH$_1$/ΔS$_1$ | T$_i$ ΔH$_i$/ΔS$_i$ | Cooling T$_1$ ΔH$_1$/ΔS$_1$ | T$_i$ ΔH$_i$/ΔS$_i$ |
|---|---|---|---|---|---|---|
| IX P | 0 | 77 | — | 247 / 3.71/7.14 | — | 135 / 1.20/2.94 |
| X P | 1 | 29 | 80 / 0.39/1.11 | 210 / 1.88/3.88 | 75 / 0.33/0.94 | 164 / 1.35/3.10 |
| XI P | 2 | 2 | 71 / 0.53/1.55 | 161 / 0.97/2.24 | 63 / 0.22/0.65 | 124 / 0.45/1.13 |

TABLE 7-continued

Thermal transitions and thermodymanic Parameters pf polymers

| | | | Heating | | Cooling | |
|---|---|---|---|---|---|---|
| | | | $T_1$ | $T_i$ | $T_1$ | $T_i$ |
| Polymer type | $m^b$ | $T_g$ | $\Delta H_1/\Delta S_1$ | $\Delta H_i/\Delta S_i$ | $\Delta H_1/\Delta S_1$ | $\Delta H_i/\Delta S_i$ |
| XII P | 3 | −14 | 60 | 124 | 29 | 113 |
| | | | 0.84/2.51 | 0.11/0.29 | 0.52/1.73 | 0.03/0.07 |
| XI P$^c$ | 2 | −7 | 69 | 161 | 63 | 131 |
| | | | 0.38/1.12 | 0.73/1.68 | 0.36/1.08 | 0.67/1.65 |
| 2B$^d$ | —$^d$ | 44 | 76.1 | 158.4 | 66.2 | 153.0 |
| | | | 0.17/0.49 | 0.30/0.71 | 0.17/0.50 | 0.27/0.63 |

$^a$mru = mole repeat unit.
$^b$m according to Scheme 3.
$^c$polymethylhydrogensiloxane $\overline{Mn}$ = 2270.

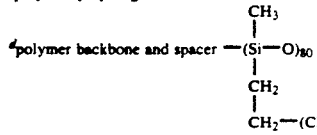

$^d$polymer backbone and spacer

C. S. Hsu, et al., J. Polym. Sci., Polym. Chem., 25, 2425 (1987).

Figure 10:
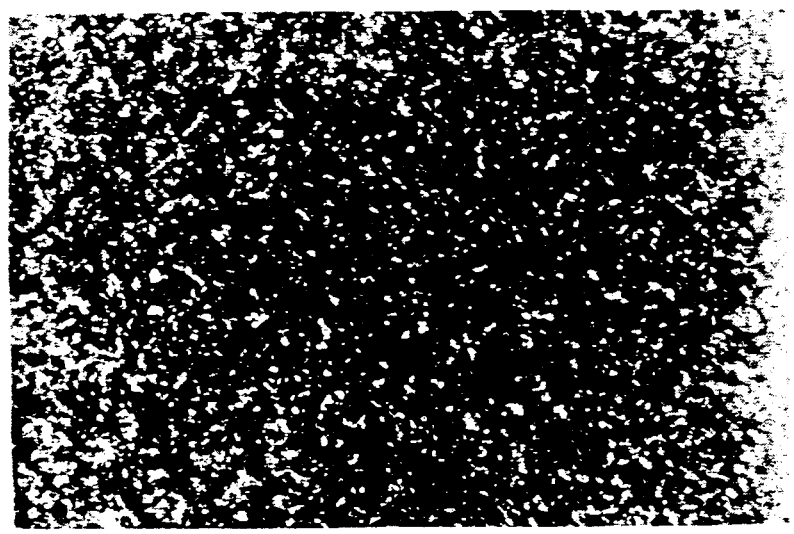
FIG. 10 is a typical optical polarizing micrograph (magnification 500×) of the smectic texture exhibited by polymer XII P obtained after 24 hr annealing at 30° C. on cooling.

FIG. 10 shows the smectic texture exhibited by polymer XII P. Also in Table 7, the data of polymer XII P and 2B demonstrate the differences between the side-chain liquid crystalline polymers with oligooxyethylene units in the spacer and the analoguous polymers with only polymethylene units in the spacer. According to their thermal transition temperatures, we can conclude that the introduction of oxygen into the flexible spacer decreases both the glass transition and the isotropization temperatures of the side-chain liquid crystalline polymers.

The olefinic monomers containing trans 2,5-disubstituted-1,3dioxanes based mesogenic unit synthesized in this example all exhibit a Nematic mesophasim, however the resultant side-chain liquid crystalline polysiloxanes show a Smectic texture in the polarizing micrographs due to polymer effect. In conclusion, all of the synthesized polymers show only liquid crystalline mesophases and do not undergo side chain crystallization even if the very long spacers containing oligooxyethylene units were used to connect the polymer backbone and the mesogenic units. This result must be due to the mesogenic units which exhibit conformational isomerism. On the other hand, the nature of the spacer plays quite important role on a side-chain liquid crystalline polymer. It is shown that the incorporation of oxygen atoms in spacer lead to the decrease of both glass transition and isotropization temperatures.

EXAMPLE 3

Preparation of polymer electrolytes from Li metal salt and side-chain liquid crystalline polymers a) Preparation of LiSO$_3$CF$_3$ To a lithium hydroxide (LiOH.2H$_2$O, 4.20 g, 0.10 mol) aqueous solution, HSO$_3$CF$_3$ (15.01 g, 0.10 mol) was added dropwise. Water was evaporated from the resulting solution in a rotavapor, the residue was recrystallized in ethyl cyanide/toluene to yield LiSO$_3$CF$_3$. The LiSO$_3$CF$_3$ obtained was then dried under vaccum at 140° C. for 24 hr.

b) Preparation of side-chain liquid crystalline polysiloxane

A poly(methylhydrogensiloxane) having $\overline{Mn}$=2270 available from Petrach System Inc. as PS120 was used to prepare the side-chain liquid crystalline polymer VII P of above Example 1.

c) Preparation of polymer-Li salt complexes

Li-salt complexes were prepared by forming a homogenous solution of the polymer VII P of above step b) and LiSO$_3$CF$_3$ in acetonitrile. The acetonitrile was removed by evaporation and the complexes were dried by heating under vacuum at 60° C. for a few days.

Figure 11:
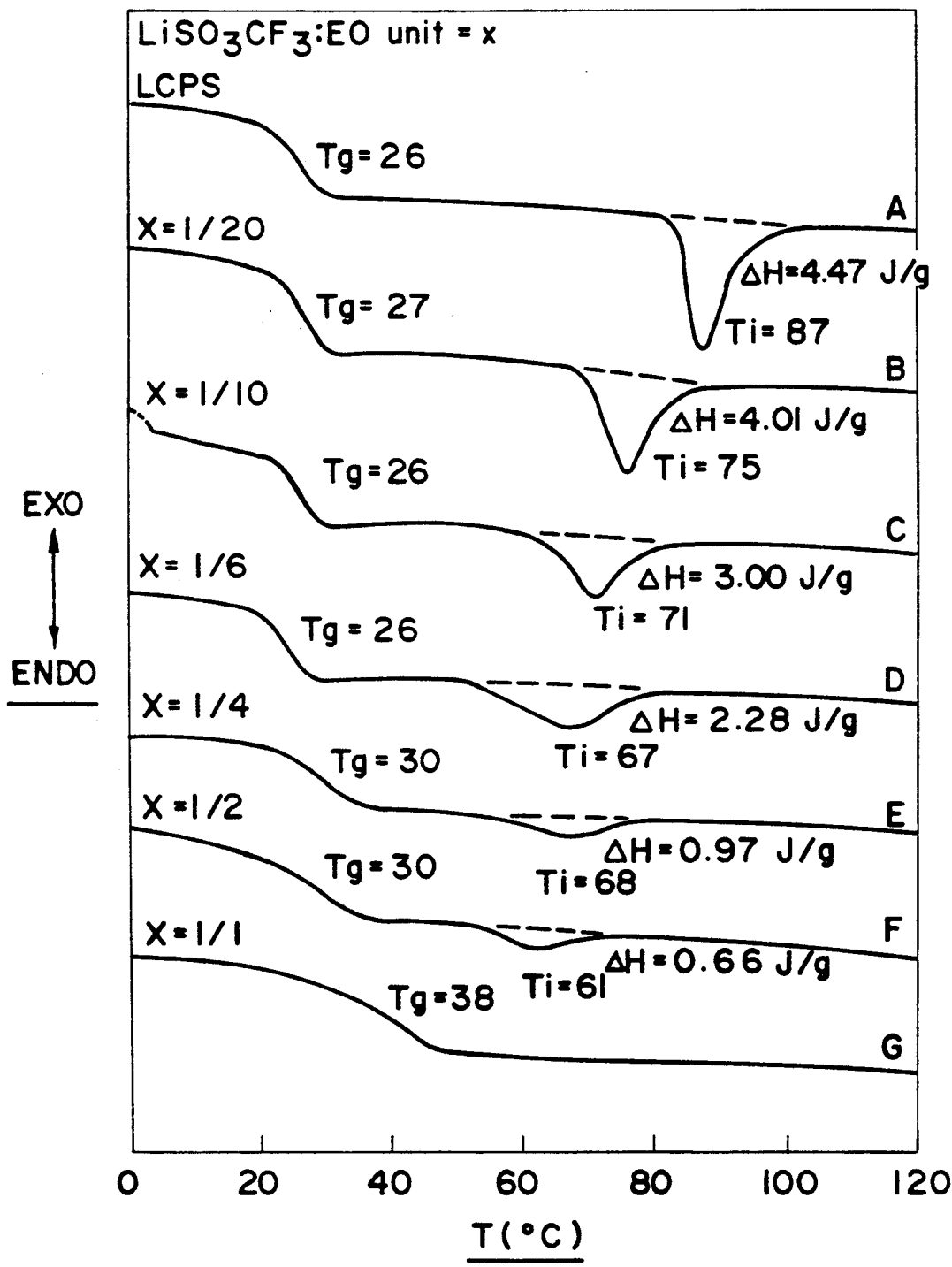
FIG. 11 is a plot which shows normalized DSC traces for pure LCPS (A) and LiSO$_3$CF$_3$-LCPS complexes with LiSO$_3$CF$_3$ to ethylene oxide unit ratios of 1/20 (B), 1/10 (C), 1/6 (D), ¼ (E), ½ (F) and 1/1 (G)
Figure 12:
FIG. 12 is a typical optical polarized micrograph of LCPS (magnification 500×): smectic A texture obtained after cooling it from isotropic phase to 82° C.
Figure 13A:
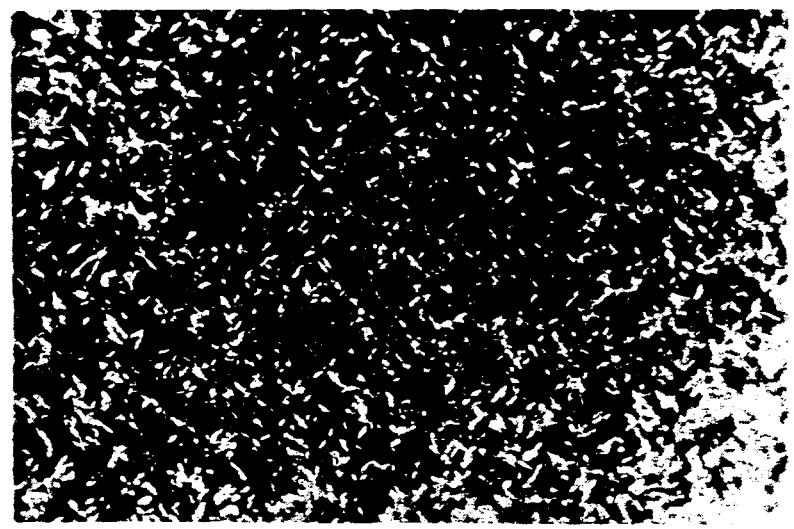
FIGS. 13A, B, and C are typical optical polarized micrographs (magnification 500×) of A) the complex with LiSO$_3$CF$_3$ to ethylene oxide unit ratio of 1/6, B) the complex with LiSO$_3$CF$_3$ to ethylene oxide unit ratio of ¼, C) the complex with LiSO$_3$CF$_3$ to ethylene oxide unit ratio of 1/1.
Figure 13B:
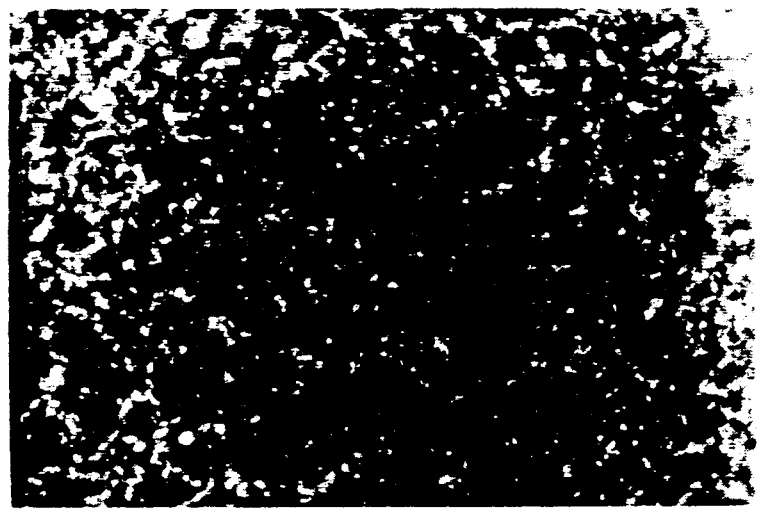
Figure 13C:
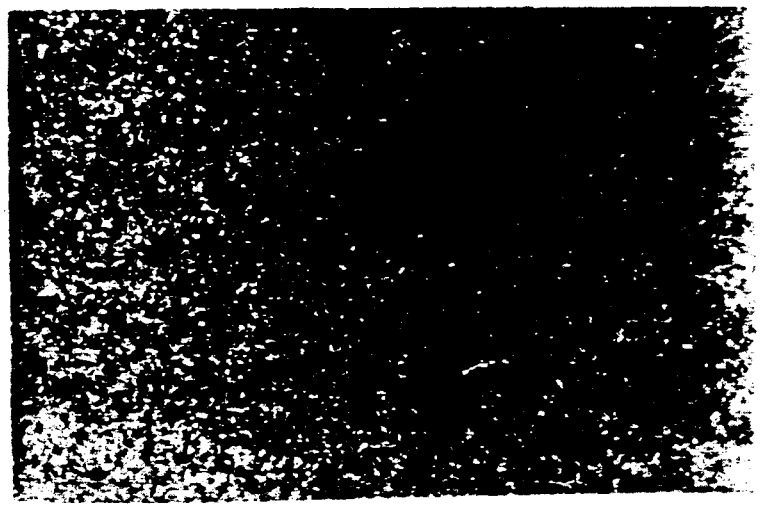

FIG. 11 represents the normalizwd DSC traces of the side-chain liquid crystalline polysiloxane (abbreviated as LCPS) (curve A) and the LCPS—LiSO$_3$CF$_3$ complexes (curves B–G). The LCPS shows the glass transition temperature (Tg) at 26° C. followed by a liquid crystalline mesophase, which undergoes isotropization at 87° C. FIG. 12 shows the typical focal-conic fan texture of smectic A mesophase of the LCPS. Addition of Li-salt to LCPS causes the shift in both the glass transition temperature and the isotropization temperature of LiSO$_3$CF$_3$—LCPS complexes. The glass transition temperatures for LCPS—LiSO$_3$CF$_3$ complexes are nearly constant when their LiSO$_3$CF$_3$ to ethylene oxide unit ratios are smaller than 1/6. However, when the LiSO$_3$CF$_3$ to ethylene oxide unit ratios are larger than 1/6, the glass transitional temperatures of the complexes increase gradually and the transition curves become broader. This suggests that complexation of the salts with ethylene oxide chains of LCPS leads to side chain stiffening or crosslinking when the salt content is sufficiently large. The isotropization temperature (Ti) and the isotropization enthalpy (ΔHi) of the complexes decrease with increasing amount of LiSO$_3$CF$_3$ in the complexes. The reason is that the free liquid crystalline domain decreases as the salt content increases. Curve G reveals that the free liquid crystalline domain completely disappears when the LiSO$_3$CF$_3$ to ethylene oxide unit ratio of a complex is equal to 1. FIGS. 13A, 13B and 13C show three typical textures for the complexes with LiSO$_3$CF$_3$ to ethylene oxide unit ratio of 1/6, ¼ and 1/1 respectively. The textures are completely different from that of the LCPS. FIG. 13A exhibited by the complex with LiSO$_3$CF$_3$ to ethylene oxide unit ratio of 1/6, shows some big free liquid crystalline domains. FIG. 13B exhibited by the complex with LiSO$_3$CF$_3$ to ethylene oxide unit ratio of ¼, shows only very small free liquid crystalline domains. FIG. 13C exhibited by the complex with LiSO$_3$CF$_3$ to ethylene oxide unit ratio of 1/1, shows no free liquid crystalline domain. The textures coincided well with the DSC results.

Figure 14:
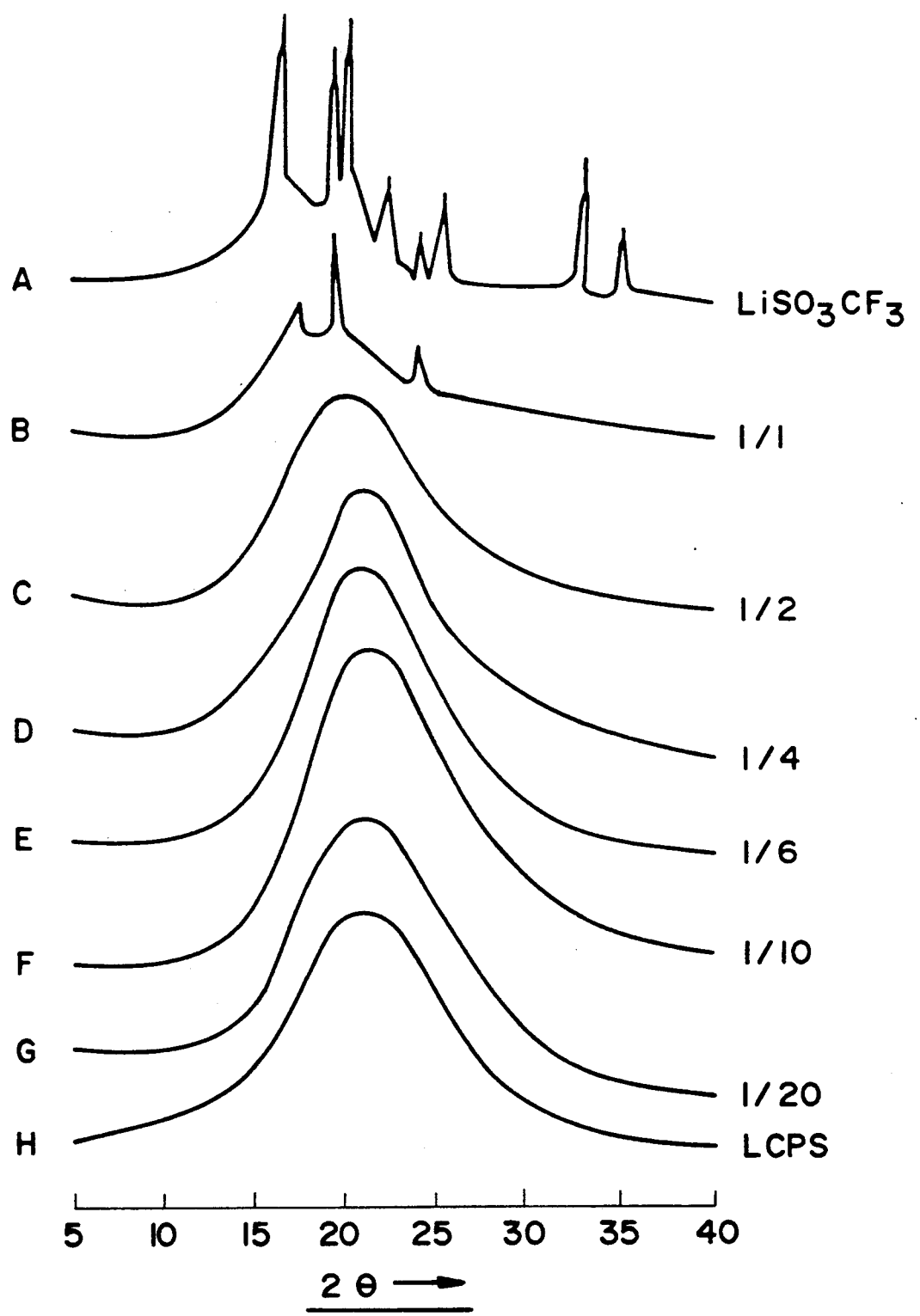
FIG. 14 is a plot which shows X-ray diffraction patterns for LiSO$_3$CF$_3$ (A), LCPS (H) and the complexes with LiSO$_3$CF$_3$ to ethylene oxide unit ratio of 1/1 (B), ½ (C), ¼ (D), 1/6 (E), 1/10 (F) and 1/20 (G)

FIG. 14 shows the X-ray diffraction patterns of LiSO$_3$CF$_3$, LCPS and their complexes with various stoichiometries. For LCPS (curve H), only a big amorphous halo is observed at 2θ=21° and its smectic layer diffraction peak does not appear. The reason is that the side-chain of the LCPS is very long and its smectic layer diffraction is at small angle range (<5°) which was out of the scanning range of the instrument we used. For the complexes with LiSO$_3$CF$_3$ to ethylene oxide unit ratios smaller than ½, only an amorphous halo is observed on each of the patterns (curves C–G). This indicates that the Li-salts completely dissolve in the polymer matrix. For the polymer-salt mixture with LiSO$_3$CF$_3$ to ethylene oxide unit ratio of 1/1, three diffraction peaks are observed at 2θ=17.8°, 19.8° and 24.7° (curve B). This mixture probably consist of the LiSO$_3$CF$_3$—LCPS complex and the free LiSO$_3$CF$_3$. These results suggest that the formation of a homogeneous phase for a complex is approximately at the LiSO$_3$CF$_3$ to ethylene oxide unit ratio of ½.

Figure 15:
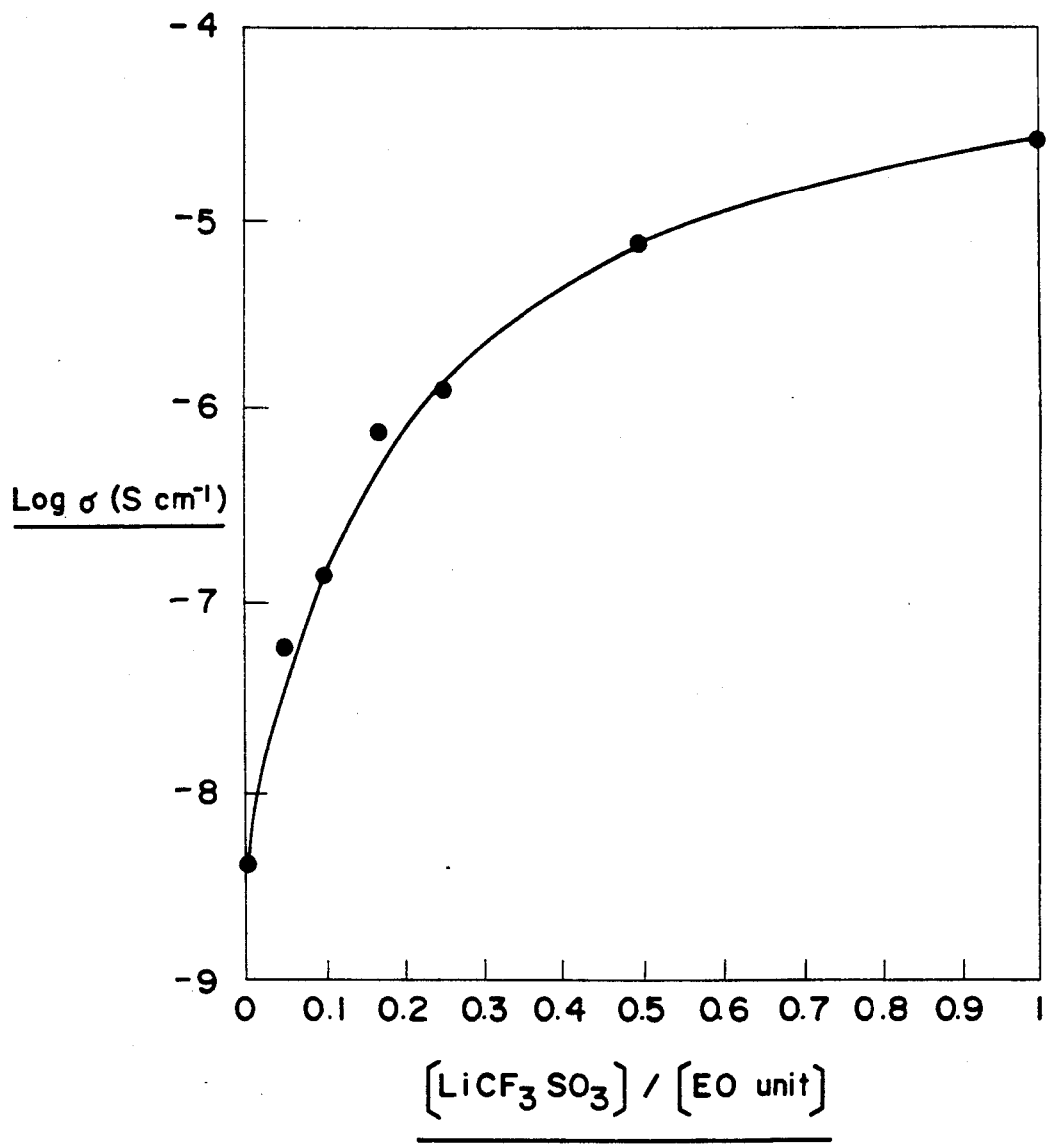
FIG. 15 is a plot which shows the relationship between the conductivity and LiSO$_3$CF$_3$ to ethylene oxide unit ratio for LiSO$_3$CF$_3$-LCPS complexes.
Figure 16:
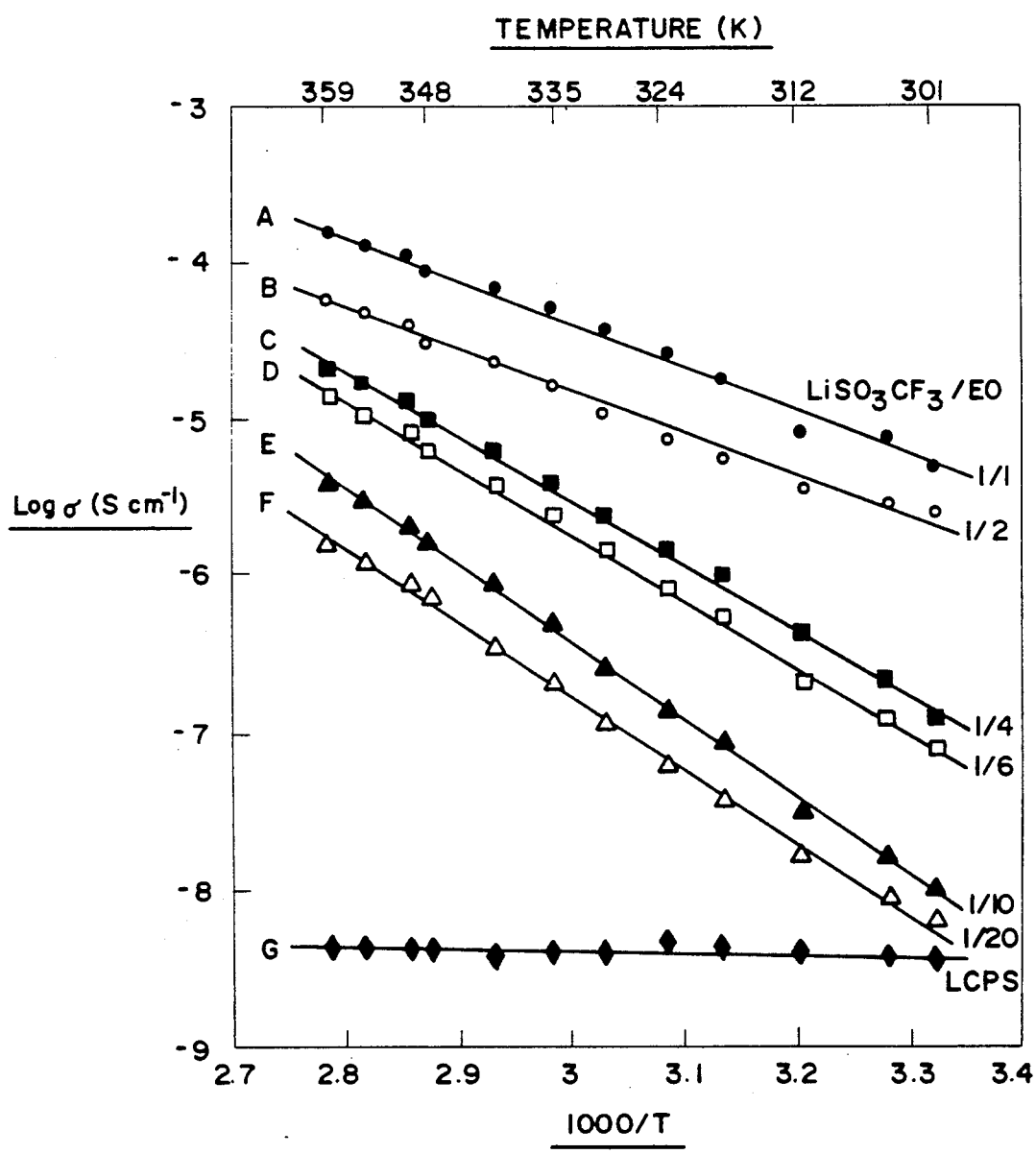
FIG. 16 is an Arrhenius polt of the temperature-dependent conductivity, log ($\sigma$) versus 1000/T, for the complexes with LiSO$_3$CF$_3$ to ethylene oxide ratios of (●) 1/1 (A), (○) ½ (B), (■) ¼ (C), (□) 1/6 (D), (▲) 1/10 (E), (△) 1/20 (F) and (◆) LCPS (G).

FIG. 15 presents the conductivities for LiSO$_3$CF$_3$—LCPS complexes as a function of the LiSO$_3$CF$_3$ to ethylene oxide unit ratio in the range of 0 to 1 at 324° K. The Conductivity plots, as log conductivity versus reciprocal temperature, for the LiSO$_3$CF$_3$—LCPS complexes and pure LCPS are shown in FIG. 16. The conductivity of the pure LCPS is basically a constant in the entire temperature range of 301° K. to 359° K. This demonstrates that the impurities had negligible effect on the conductivity of the Li-salt complexes. For the complex with LiSO$_3$CF$_3$ to ethylene oxide ratio of 1/20, the conductivity values are $6.0 \times 10^{-9}$ S cm$^{-1}$ at 301° K. and $1.6 \times 10^{-6}$ S cm$^{-1}$ at 359° K. For the complex with LiSO$_3$CF$_3$ to ethylene oxide unit ratio of 1/1, the conductivity values are $4.8 \times 10^{-6}$ S cm$^{-1}$ at 301° K. and $1.5 \times 10^{-4}$ S cm$^{-1}$ at 359° K. The results show straight lines of Arrhenius-type character in all cases. This might be due to the liquid crystalline behavior of the polymer matrix. The activation energies decrease as Li-salt content increases. The lowest activation energy is 53 KJ mole$^{-1}$ for the complexes with LiSO$_3$CF$_3$ to ethylene oxide unit of ½.

In conclusion, polymer electrolytes are formed by incorporating LiSO$_3$CF$_3$ with a side chain liquid crystalline polysiloxane. The formation of a homogenous phase for a complex is approximately at the LiSO$_3$CF$_3$ to ethylene oxide unit ratio of ½. The highest conductivity is obtained for the complex with LiSO$_3$CF$_3$ to ethylene oxide unit ratio of 1/1. The temperature dependence of conductivity shows the Arrhenius-type behavior for all obtained complexes. Although the weight percentage of the ethylene oxide units in the LCPS is very low, the conductivity data for the obtained complexes are comparable with those reported for the complexes based on other comb-like polymers containing oligo(oxyethylene) side groups. This is due to the low glass transition temperature and high mobility of the side chains for the liquid crystalline polymer.

What we claim is:

1. An ionic conducting polymer electrolyte comprising a complex which comprises an alkali metal salt and a side-chain liquid crystalline polysiloxane containing oligo(oxyethylene) spacers and 6-cyano-2-naphthyl benzyl ether mesogens of the formula

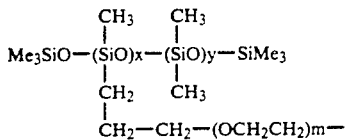

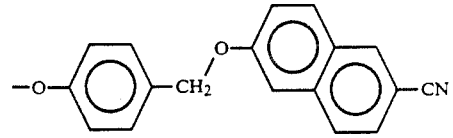

where Me=—CH$_3$; m is an integer of 1 to 5; x=10–100%; and y=0–90%, wherein the ratio of the alkali metal salt to ethylene oxide unit is ranging from 1 to 1/30, and the weight average molecular weight of the polysiloxane backbone is 1000–15000.

* * * * *